United States Patent
Han et al.

(10) Patent No.: US 8,891,632 B1
(45) Date of Patent: *Nov. 18, 2014

(54) METHOD AND APPARATUS FOR ENCODING VIDEO AND METHOD AND APPARATUS FOR DECODING VIDEO, BASED ON HIERARCHICAL STRUCTURE OF CODING UNIT

(71) Applicant: Samsung Electronics Co., Ltd., Suwon-si (KR)

(72) Inventors: Woo-jin Han, Suwon-si (KR); Jung-hye Min, Suwon-si (KR); Il-koo Kim, Osan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,574

(22) Filed: Jul. 18, 2014

Related U.S. Application Data

(63) Continuation of application No. 14/219,195, filed on Mar. 19, 2014, which is a continuation of application No. 12/911,066, filed on Oct. 25, 2010, now Pat. No. 8,798,159.

(30) Foreign Application Priority Data

Oct. 23, 2009 (KR) .................. 10-2009-0101191

(51) Int. Cl.
| | |
|---|---|
| *H04N 7/12* | (2006.01) |
| *H04N 19/124* | (2014.01) |
| *H04N 19/44* | (2014.01) |
| *H04N 19/30* | (2014.01) |
| *H04N 19/169* | (2014.01) |
| *H04N 19/537* | (2014.01) |

(52) U.S. Cl.
CPC ..... *H04N 19/0009* (2013.01); *H04N 19/00533* (2013.01); *H04N 19/00424* (2013.01); *H04N 7/26239* (2013.01); *H04N 7/26787* (2013.01)
USPC .................................................. 375/240.24

(58) Field of Classification Search
CPC .......... H04N 7/26787; H04N 7/26239; H04N 19/0009
USPC ........................................................ 375/240
See application file for complete search history.

(56) References Cited

U.S. PATENT DOCUMENTS

| | | |
|---|---|---|
| 4,849,810 A | 7/1989 | Ericsson |
| 5,166,686 A | 11/1992 | Sugiyama |

(Continued)

FOREIGN PATENT DOCUMENTS

| | | |
|---|---|---|
| CN | 1857001 A | 11/2006 |
| KR | 10-2005-0045746 A | 5/2005 |

(Continued)

OTHER PUBLICATIONS

Kondo et al. "A Motion Compensation Technique Using Sliced Blocks in Hybrid Video Coding" (Sep. 2005) ICIP 2005.*

(Continued)

*Primary Examiner* — Sath V Perungavoor
*Assistant Examiner* — Matthew J Anderson
(74) *Attorney, Agent, or Firm* — Sughrue Mion, PLLC

(57) ABSTRACT

An apparatus and method for encoding video data and an apparatus and method for decoding video data are provided. The encoding method includes: splitting a current picture into at least one maximum coding unit; determining a coded depth to output an encoding result by encoding at least one split region of the at least one maximum coding unit according to operating mode of coding tool, respectively, based on a relationship among a depth of at least one coding unit of the at least one maximum coding unit, a coding tool, and an operating mode, wherein the at least one split region is generated by hierarchically splitting the at least one maximum coding unit according to depths; and outputting a bitstream including encoded video data of the coded depth, information regarding a coded depth of at least one maximum coding unit, information regarding an encoding mode, and information regarding the relationship.

4 Claims, 17 Drawing Sheets

CODING UNIT (710)

64×64

TRANSFORMATION UNIT (720)

32×32

(56) References Cited

U.S. PATENT DOCUMENTS

| | | | |
|---|---|---|---|
| 5,241,395 A | 8/1993 | Chen | |
| 5,446,806 A | 8/1995 | Ran et al. | |
| 5,448,297 A * | 9/1995 | Alattar et al. | 375/240.12 |
| 5,703,652 A * | 12/1997 | Kondo et al. | 375/240.24 |
| 5,768,434 A | 6/1998 | Ran | |
| 5,867,602 A | 2/1999 | Zandi et al. | |
| 5,949,488 A * | 9/1999 | Kim | 375/240.04 |
| 5,966,179 A * | 10/1999 | Kondo et al. | 375/240.18 |
| 6,084,908 A | 7/2000 | Chiang et al. | |
| 6,539,119 B1 | 3/2003 | Kondo et al. | |
| 6,873,734 B1 | 3/2005 | Zandi et al. | |
| 7,006,697 B1 | 2/2006 | Gormish et al. | |
| 7,830,963 B2 | 11/2010 | Holcomb | |
| 8,086,052 B2 | 12/2011 | Toth et al. | |
| 8,160,374 B2 * | 4/2012 | Zheng et al. | 382/239 |
| 8,270,472 B2 | 9/2012 | Lai et al. | |
| 8,270,747 B2 * | 9/2012 | Isomura | 382/253 |
| 8,331,433 B2 | 12/2012 | Kim et al. | |
| 8,625,917 B2 * | 1/2014 | Zheng et al. | 382/239 |
| 8,649,620 B2 * | 2/2014 | Shibahara et al. | 382/233 |
| 8,750,634 B2 * | 6/2014 | Cohen et al. | 382/233 |
| 2005/0024487 A1 * | 2/2005 | Chen | 348/14.13 |
| 2005/0114093 A1 | 5/2005 | Cha et al. | |
| 2006/0251330 A1 | 11/2006 | Toth et al. | |
| 2009/0003437 A1 | 1/2009 | Cho et al. | |
| 2009/0097549 A1 | 4/2009 | Kim et al. | |
| 2009/0110054 A1 | 4/2009 | Kim et al. | |
| 2009/0110073 A1 | 4/2009 | Wu et al. | |
| 2010/0008592 A1 * | 1/2010 | Boon et al. | 382/238 |
| 2010/0135393 A1 | 6/2010 | Ying Gao et al. | |
| 2010/0295922 A1 | 11/2010 | Cheung et al. | |
| 2011/0310976 A1 * | 12/2011 | Wang et al. | 375/240.24 |

FOREIGN PATENT DOCUMENTS

| | | |
|---|---|---|
| KR | 10-2006-0027795 A | 3/2006 |
| KR | 10-0842558 B1 | 6/2008 |

OTHER PUBLICATIONS

International Serach Report and Written Opinion issued Jun. 10, 2011 in counterpart international Application No. PCT/KR2010/007257.

Kim, Jong and Lee, Sang. "On the Hierarchical Variable Block Size Motion Estimation Technique for Motion Sequence Coding", (Dec. 1993) Seoul National University: Signal Processing Lab.

Vaisey et al. "Variable Block-Size Image Coding", (Apr. 1987) Acoustics, Speech, and Signal Processing, IEEE International Conference on ICASSP '87.

Communication dated Apr. 11, 2014, issued by the Korean Intellectual Property Office in counterpart Korean Application No. 10-2009-0101191.

Communication dated Jul. 3, 2014, issued by the State Intellectual Property of the People's Republic of China in counterpart Chinese Application No. 201080047875.7.

\* cited by examiner

CODING UNITS (1010)

```
sequence_parameter_set(){
    picture_width
    picture_height
    max_coding_unit_size
    max_coding_unit_depth
    use_independent_cu_decode_flag
    use_independent_cu_parse_flag
    use_mv_accuracy_control_flag
    use_arbitrary_direction_intra_flag
    use_frequency_domain_prediction_flag
    use_rotational_transform_flag
    use_tree_significant_map_flag
    use_multi_parameter_intra_prediction_flag
    use_advanced_motion_vector_prediction_flag
    use_adaptive_loop_filter_flag
    use_quadtree_adaptive_loop_filter_flag
    use_delta_qp_flag
    use_random_noise_generation_flag
    use_asymmetric_motion_partition_flag
    for( uiDepth = 0; uiDepth < max_coding_unit_depth; uiDepth++ ){
        mvp_mode [uiDepth]
        significant_map_mode [uiDepth]
    }
    input_sample_bit_depth
    internal_sample_bit_depth
    if( use_adaptive_loop_filter_flag && !use_quadtree_adaptive_loop_filter_flag ){
    alf_filter_length
    alf_filter_type
    alf_qbits
    alf_num_color
    }
}
```

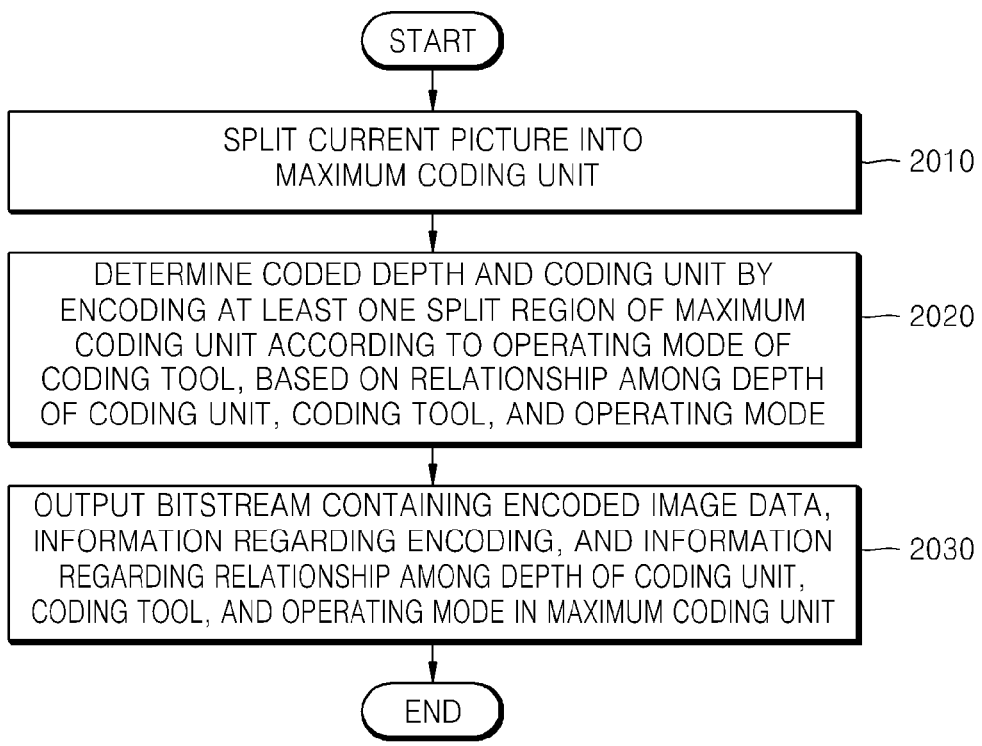
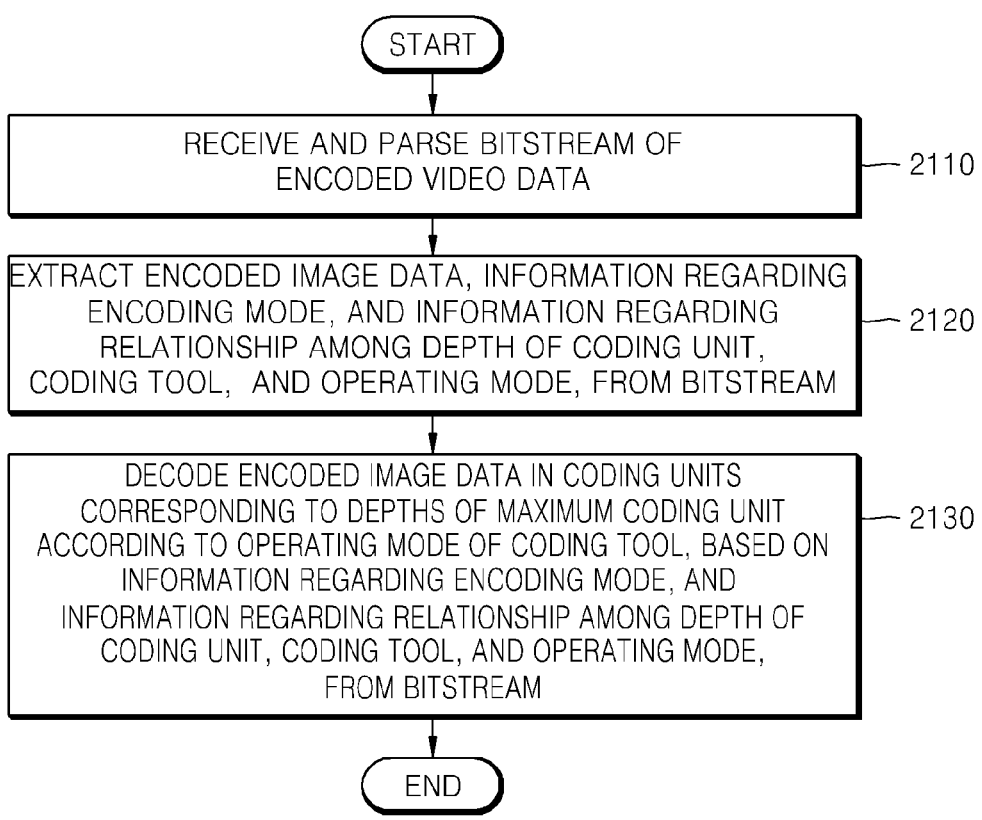

METHOD AND APPARATUS FOR ENCODING VIDEO AND METHOD AND APPARATUS FOR DECODING VIDEO, BASED ON HIERARCHICAL STRUCTURE OF CODING UNIT

CROSS-REFERENCE TO RELATED PATENT APPLICATIONS

This application is a Continuation Application of U.S. application Ser. No. 14/219,195, filed Mar. 19, 2014, which is a Continuation Application of U.S. application Ser. No. 12/911,066 filed Oct. 25, 2010, which claims priority from Korean Patent Application No. 10-2009-0101191, filed on Oct. 23, 2009 in the Korean Intellectual Property Office, the disclosures of which are incorporated herein in their entirety by reference.

BACKGROUND

1. Field

Apparatuses and methods consistent with exemplary embodiments relate to encoding and decoding a video.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size.

SUMMARY

One or more exemplary embodiments provide a method and apparatus for encoding a video and a method and apparatus for decoding a video in an operating mode of a coding tool that varies according to a size of a hierarchical structured coding unit.

According to an aspect of an exemplary embodiment, there is provided a method of encoding video data, the method including: splitting a current picture of the video data into at least one maximum coding unit; determining a coded depth to output a final encoding result by encoding at least one split region of the at least one maximum coding unit according to at least one operating mode of at least one coding tool, respectively, based on a relationship among a depth of at least one coding unit of the at least one maximum coding unit, a coding tool, and an operating mode, wherein the at least one split region is generated by hierarchically splitting the at least one maximum coding unit according to depths; and outputting a bitstream including encoded video data of the coded depth, information regarding a coded depth of at least one maximum coding unit, information regarding an encoding mode, and information regarding the relationship among the depth of the at least one coding unit of the at least one maximum coding unit, the coding tool, and the operating mode in the at least one maximum coding unit, wherein the coding unit may be characterized by a maximum size and a depth, the depth denotes a number of times a coding unit is hierarchically split, and as a depth deepens, deeper coding units according to depths may be split from the maximum coding unit to obtain minimum coding units, wherein the depth is deepened from an upper depth to a lower depth, wherein as the depth deepens, a number of times the maximum coding unit is split increases, and a total number of possible times the maximum coding unit is split corresponds to a maximum depth, and wherein the maximum size and the maximum depth of the coding unit may be predetermined. An operation mode of a coding tool for a coding unit is determined according to a depth of the coding unit.

The information regarding the relationship among the depth of the at least one coding unit of the at least one maximum coding unit, the coding tool, and the operating mode, may be preset in slice units, frame units, or frame sequence units of the current picture.

The at least one coding tool for the encoding of the at least one maximum coding unit may include at least one of quantization, transformation, intra prediction, inter prediction, motion compensation, entropy encoding, and loop filtering.

If the coding tool, an operating mode of which is determined according to a depth of a coding unit, is intra prediction, the operating mode may include at least one intra prediction mode classified according to a number of directions of intra prediction or may include an intra prediction mode for smoothing regions in coding units corresponding to depths and an intra prediction mode for retaining a boundary line.

If the coding tool, an operating mode of which is determined according to a depth of a coding unit, is inter prediction, the operating mode may include an inter prediction mode according to at least one method of determining a motion vector.

If the coding tool, an operating mode of which is determined according to a depth of a coding unit, is transformation, the operating mode may include at least one transformation mode classified according to an index of a matrix of rotational transformation.

If the coding tool, an operating mode of which is determined according to a depth of a coding unit, is quantization, the operating mode may include at least one quantization mode classified according to whether a quantization parameter delta is to be used.

According to an aspect of another exemplary embodiment, there is provided a method of decoding video data, the method including: receiving and parsing a bitstream including encoded video data; extracting, from the bitstream, the encoded video data, information regarding a coded depth of at least one maximum coding unit, information regarding an encoding mode, and information regarding a relationship among a depth of at least one coding unit of the at least one maximum coding unit, a coding tool, and an operating mode; and decoding the encoded video data in the at least one maximum coding unit according to an operating mode of a coding tool matching a coding unit corresponding to at least one coded depth, based on the information regarding the coded depth of the at least one maximum coding unit, the information regarding the encoding mode, and the information regarding the relationship among the depth of the at least one coding unit of the at least one maximum coding unit, the coding tool, and the operating mode, wherein the operation mode of the coding tool for a coding unit is determined according to the coded depth of the coding unit.

The information regarding the relationship among the depth of the at least one coding unit of the at least one maximum coding unit, the coding tool, and the operating mode may be extracted in slice units, frame units, or frame sequence units of the current picture.

The coding tool for the encoding of the at least one maximum coding unit may include at least of quantization, transformation, intra prediction, inter prediction, motion compensation, entropy encoding, and loop filtering, wherein the decoding the encoded video data may include performing a decoding tool corresponding to the coding tool for the encoding of the at least one maximum coding unit.

According to an aspect of another exemplary embodiment, there is provided an apparatus for encoding video data, the apparatus including: a maximum coding unit splitter which splits a current picture of the video data into at least one maximum coding unit; a coding unit determiner which determines a coded depth to output a final encoding result by encoding at least one split region of the at least one maximum coding unit according to at least one operating mode of at least one coding tools, respectively, based on a relationship among a depth of at least one coding unit of the at least one maximum coding unit, a coding tool, and an operating mode, wherein the at least one split region is generated by hierarchically splitting the at least one maximum coding unit according to depths; and an output unit which outputs a bitstream including encoded video data that is the final encoding result, information regarding a coded depth of the at least one maximum coding unit, information regarding an encoding mode, and information regarding the relationship among the depth of the at least one coding unit of the at least one maximum coding unit, the coding tool, and the operating mode in the at least one maximum coding unit. An operation mode of a coding tool for a coding unit is determined according to a depth of the coding unit According to an aspect of another exemplary embodiment, there is provided an apparatus for decoding video data, the apparatus including: a receiver which receives and parses a bitstream including encoded video data; an extractor which extracts, from the bitstream, the encoded video data, information regarding a coded depth of at least one maximum coding unit, information regarding an encoding mode, and information regarding a relationship among a depth of at least one coding unit of the at least one maximum coding unit, a coding tool, and an operating mode; and a decoder which decodes the encoded video data in the at least one maximum coding unit according to an operating mode of a coding tool matching a coding unit corresponding to at least one coded depth, based on the information regarding the coded depth of the at least one maximum coding unit, the information regarding the encoding mode, and the information regarding the relationship among the depth of the at least one coding unit of the at least one maximum coding unit, the coding tool, and the operating mode, wherein the operation mode of the coding tool for a coding unit is determined according to the coded depth of the coding unit.

According to an aspect of another exemplary embodiment, there is provided a method of decoding video data, the method including: decoding encoded video data in at least one maximum coding unit according to an operating mode of a coding tool matching a coding unit corresponding to at least one coded depth, based on information regarding a coded depth of the at least one maximum coding unit, information regarding an encoding mode, and information regarding a relationship among a depth of at least one coding unit of the at least one maximum coding unit, a coding tool, and an operating mode, wherein the operation mode of the coding tool for a coding unit is determined according to the coded depth of the coding unit.

According to an aspect of another exemplary embodiment, there is provided a computer readable recording medium having recorded thereon a program for executing the method of encoding video data.

According to an aspect of another exemplary embodiment, there is provided a computer readable recording medium having recorded thereon a program for executing the method of decoding video data.

BRIEF DESCRIPTION OF THE DRAWINGS

The above and/or other aspects will become more apparent by describing in detail exemplary embodiments with reference to the attached drawings in which:

FIG. 21 illustrates syntax of a sequence parameter set, in which information regarding a relationship among a depth of a coding unit, a coding tool, and an operating mode is inserted, according to an exemplary embodiment;

FIG. 22 is a flowchart illustrating a video encoding method based on a coding tool considering the size of a coding unit, according to an exemplary embodiment; and FIG. 23 is a flowchart illustrating a video decoding method based on a coding tool considering the size of a coding unit, according to an exemplary embodiment.

DETAILED DESCRIPTION

Hereinafter, exemplary embodiments will be described more fully with reference to the accompanying drawings. Furthermore, expressions such as "at least one of," when preceding a list of elements, modify the entire list of elements and do not modify the individual elements of the list. In the exemplary embodiments, "unit" may or may not refer to a unit of size, depending on its context. Specifically, video encoding and decoding performed based on spatially hierarchical data units according to one or more exemplary embodiments will be described with reference to FIGS. 1 to 15. Also, video encoding and decoding performed in an operating mode of a coding tool that varies according to the size of a coding unit according to one or more exemplary embodiments will be described with reference to FIGS. 16 to 23.

In the following exemplary embodiments, a "coding unit" refers to either an encoding data unit in which image data is encoded at an encoder side or an encoded data unit in which encoded image data is decoded at a decoder side. Also, a "coded depth" refers to a depth at which a coding unit is encoded. Hereinafter, an "image" may denote a still image for a video or a moving image, that is, the video itself.

An apparatus and method for encoding a video and an apparatus and method for decoding a video according to exemplary embodiments will now be described with reference to FIGS. 1 to 15.

Figure 1:
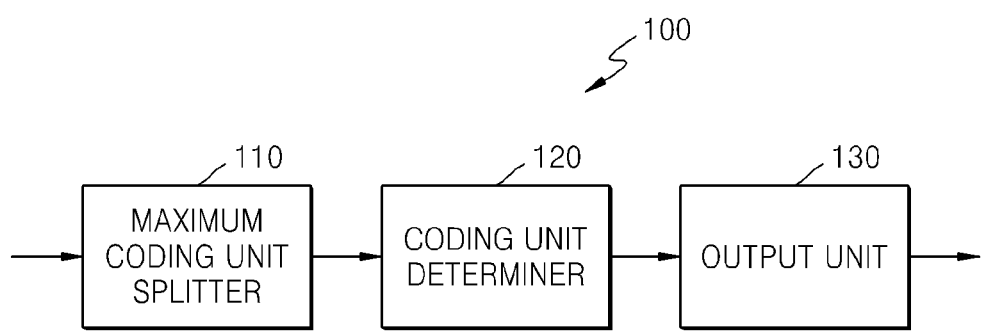
FIG. 1 is a block diagram of a video encoding apparatus according to an exemplary embodiment.

FIG. 1 is a block diagram of a video encoding apparatus 100, according to an exemplary embodiment. Referring to FIG. 1, the video encoding apparatus 100 includes a maximum coding unit splitter 110, a coding unit determiner 120, and an output unit 130.

The maximum coding unit splitter 110 may split a current picture of an image based on a maximum coding unit for the current picture. If the current picture is larger than the maximum coding unit, image data of the current picture may be split into at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture may be split into the maximum coding units according to a maximum size of the coding unit, and each of the maximum coding units may include deeper coding units that are split according to depths. Since the maximum coding unit according to an exemplary embodiment is split according to depths, image data of a spatial domain included in the maximum coding unit may be hierarchically classified according to depths.

A maximum depth and a maximum size of a coding unit, which limit the total number of times a height and a width of the maximum coding unit can be hierarchically split, may be predetermined.

The coding unit determiner 120 encodes at least one split region obtained by splitting a region of the maximum coding unit according to depths, and determines a depth to output an encoded image data according to the at least one split region. That is, the coding unit determiner 120 determines a coded depth by encoding the image data in the deeper coding units according to depths, based on the maximum coding unit of the current picture, and selecting a depth having a least encoding error. Thus, the encoded image data of the coding unit corresponding to the determined coded depth is output to the output unit 130. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to a same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Therefore, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The coding units having a tree structure according to an exemplary embodiment include coding units corresponding to a depth determined to be the coded depth, from among deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of splitting times from a maximum coding unit to a minimum coding unit. A first maximum depth according to an exemplary embodiment may denote a total number of splitting times from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. Here, if the minimum coding unit is a coding unit in which the maximum coding unit is split four times, 5 depth levels of depths 0, 1, 2, 3 and 4 exist. Thus, the first maximum depth may be set to 4 and the second maximum depth may be set to 5.

Prediction encoding and transformation may be performed according to the maximum coding unit. The prediction encoding and the transformation are also performed based on the deeper coding units according to a depth equal to or depths less than the maximum depth, based on the maximum coding unit. Transformation may be performed according to a method of orthogonal transformation or integer transformation.

Since the number of deeper coding units increases whenever the maximum coding unit is split according to depths, encoding such as the prediction encoding and the transformation is performed on all of the deeper coding units generated as the depth deepens. For convenience of description, the prediction encoding and the transformation will hereinafter be described based on a coding unit of a current depth, in a maximum coding unit.

The video encoding apparatus 100 may variably select at least one of a size and a shape of a data unit for encoding the image data. In order to encode the image data, operations, such as prediction encoding, transformation, and entropy encoding, may be performed, and at this time, the same data unit may be used for all operations or different data units may be used for each operation.

For example, the video encoding apparatus 100 may select a coding unit for encoding the image data and a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will be referred to as a prediction unit. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting at least one of a height and a width of the prediction unit, partitions obtained by asymmetrically splitting the height or the width of the prediction unit (such as 1:n or n:1), partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. In this case, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based on the coding unit for encoding the image data and on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will hereinafter be referred to as a transformation unit. A transformation depth indicating a number of splitting times to reach the transformation unit by splitting the height and the width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into 4 transformation units, and the size of the transformation unit is thus N×N, and may be 2 when each of the height and width of the current coding unit is split into four equal parts, totally split into $4^2$ transformation units, and the size of the transformation unit is thus N/2×N/2. For example, the transformation unit may be set according to a hierarchical tree structure, in which a transformation unit of an upper transformation depth is split into four transformation units of a lower transformation depth according to hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth uses information about the coded depth and information related to prediction encoding and transformation. Accordingly, the coding unit determiner 120 determines a coded depth having a least encoding error and determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail below with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to the coded depth may include at least one of information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output. In this case, the split information may be defined to not split the current coding unit to a lower depth. Alternatively, if the current depth of the current coding unit is not the coded depth, the encoding is performed on the coding unit of the lower depth. In this case, the split information may be defined to split the current coding unit to obtain the coding units of the lower depth.

If the current depth is not the coded depth, encoding is performed on the coding unit that is split into the coding unit of the lower depth. In this case, since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit of the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units and encoding information according to prediction units. The encoding information according to the coding units may include the information about the prediction mode and the size of the partitions. The encoding information according to the prediction units may include information about an estimated direction of an inter mode, a reference image index of the inter mode, a motion vector, a chroma component of an intra mode, and an interpolation method of the intra mode. Also, information about a maximum size of the coding unit defined according to pictures, slices, or GOPs, and information about a maximum depth may be inserted into at least one of a Sequence Parameter Set (SPS) or a header of a bitstream.

In the video encoding apparatus 100, the deeper coding unit may be a coding unit obtained by dividing at least one of a height and a width of a coding unit of an upper depth, which is one layer above, by two. For example, when the size of the coding unit of the current depth is 2N×2N, the size of the coding unit of the lower depth may be N×N. Also, the coding unit of the current depth having the size of 2N×2N may include a maximum of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or a large amount of data is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an exemplary embodiment, image compression efficiency may be increased since a coding unit is adjusted while considering characteristics of an image and increasing a maximum size of a coding unit while considering a size of the image.

Figure 2:
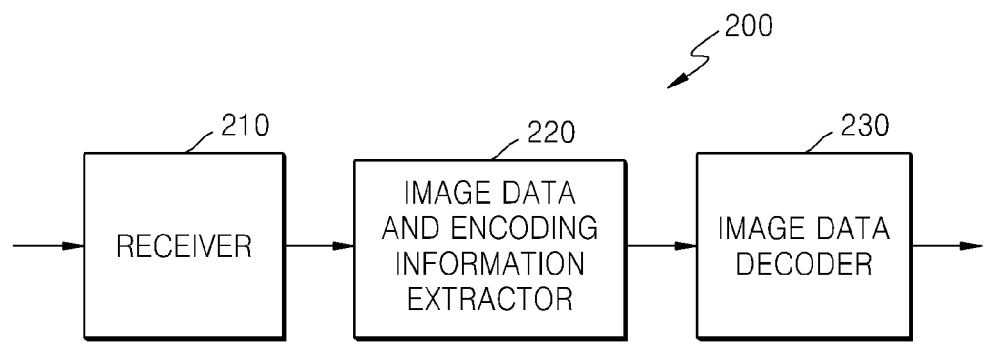
FIG. 2 is a block diagram of a video decoding apparatus according to an exemplary embodiment.

FIG. 2 is a block diagram of a video decoding apparatus 200 according to an exemplary embodiment. Referring to FIG. 2, the video decoding apparatus 200 includes a receiver 210, an image data and encoding information extractor 220, and an image data decoder 230. Definitions of various terms, such as a coding unit, a depth, a prediction unit, and a transformation unit, and information about various encoding modes for various operations of the video decoding apparatus 200 are similar to those described above with reference to FIG. 1.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture from a header about the current picture or an SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. That is, the image data in a bitstream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about at least one of a partition type of a corresponding coding unit corresponding to the coded depth, a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as a video encoding apparatus 100 according to an exemplary embodiment, repeatedly performs encoding for each deeper coding unit based on depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be the data units included in the same maximum coding unit.

The image data decoder 230 restores the current picture by decoding the image data in each maximum coding unit based on the information about the coded depth and the encoding mode according to the maximum coding units. For example, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to a method of inverse orthogonal transformation or inverse integer transformation.

The image data decoder 230 may perform at least one of intra prediction and motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using at least one of the information about the partition type of the prediction unit, the prediction mode, and the size of the transformation unit for each coding unit corresponding to the coded depth, and output the image data of the current maximum coding unit.

For example, data units including the encoding information having the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. That is, the coding units having the tree structure determined to be the optimum coding units in each maximum coding unit may be decoded. Also, the maximum size of the coding unit may be determined considering at least one of resolution and an amount of image data.

Accordingly, even if image data has high resolution and a large amount of data, the image data may be efficiently decoded and restored by using a size of a coding unit and an encoding mode, which are adaptively determined according to characteristics of the image data, and information about an optimum encoding mode received from an encoder.

A method of determining coding units having a tree structure, a prediction unit, and a transformation unit, according to one or more exemplary embodiments, will now be described with reference to FIGS. 3 through 13.

Figure 3:
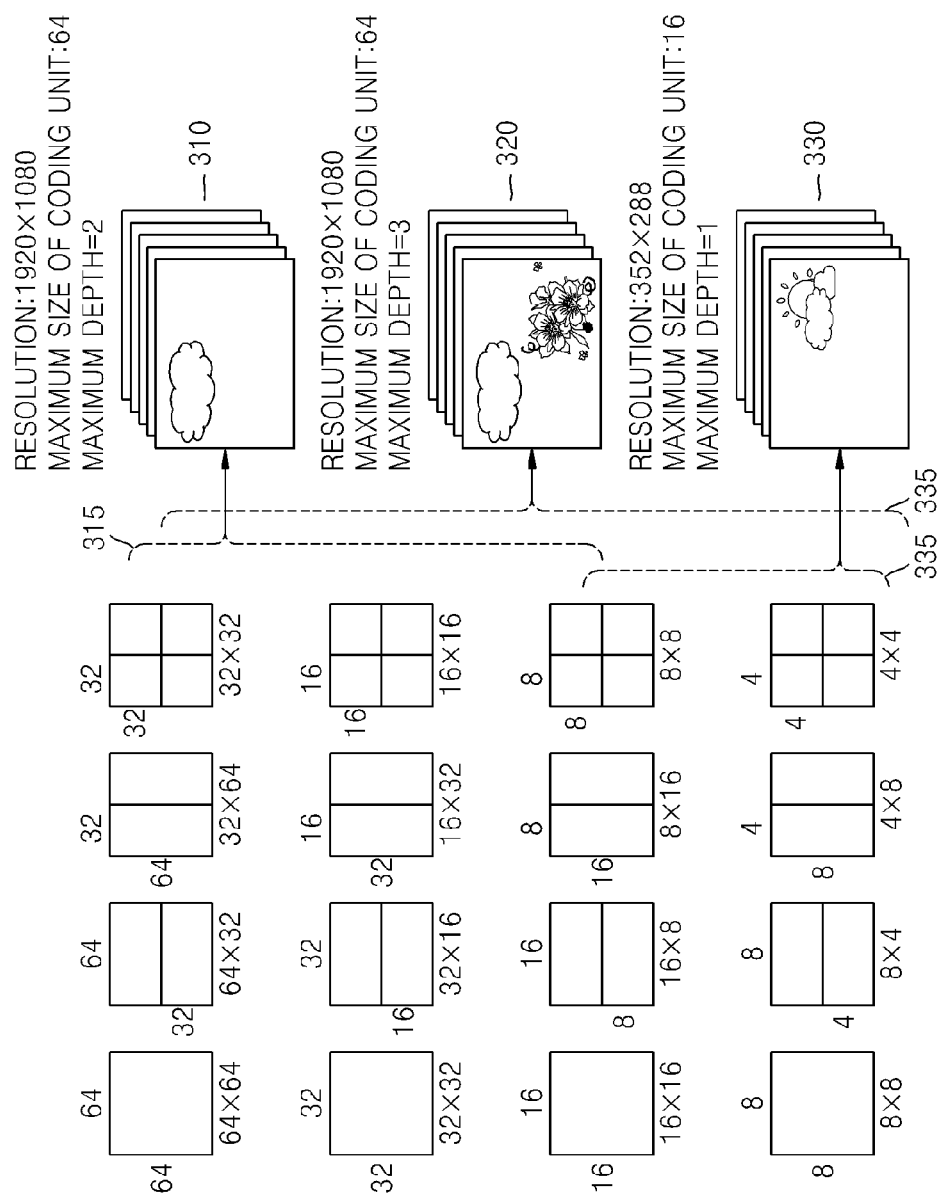
FIG. 3 is a diagram for describing a concept of coding units according to an exemplary embodiment.

FIG. 3 is a diagram for describing a concept of coding units according to an exemplary embodiment. A size of a coding unit may be expressed in width×height. For example, the size of the coding unit may be 64×64, 32×32, 16×16, or 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

Referring to FIG. 3, there is exemplarily provided first video data 310 with a resolution of 1920×1080 and a coding unit with a maximum size of 64 and a maximum depth of 2. Furthermore, there is exemplarily provided second video data 320 with a resolution of 1920×1080 and a coding unit with a maximum size of 64 and a maximum depth of 3. Also, there is exemplarily provided third video data 330 with a resolution of 352×288, and a coding unit with a maximum size of 16 and a maximum depth of 1. The maximum depth shown in FIG. 3 denotes a total number of splits from a maximum coding unit to a minimum decoding unit.

If a resolution is high or a data amount is large, a maximum size of a coding unit may be large so as to increase encoding efficiency and to accurately reflect characteristics of an image. Accordingly, the maximum size of the coding unit of the first and second video data 310 and 320 having the higher resolution than the third video data 330 may be 64.

Since the maximum depth of the first video data 310 is 2, coding units 315 of the first video data 310 may include a maximum coding unit having a long axis size of 64, and coding units having long axis sizes of 32 and 16 since depths are deepened to two layers by splitting the maximum coding unit twice. Meanwhile, since the maximum depth of the third video data 330 is 1, coding units 335 of the third video data 330 may include a maximum coding unit having a long axis size of 16, and coding units having a long axis size of 8 since depths are deepened to one layer by splitting the maximum coding unit once.

Since the maximum depth of the second video data 320 is 3, coding units 325 of the second video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
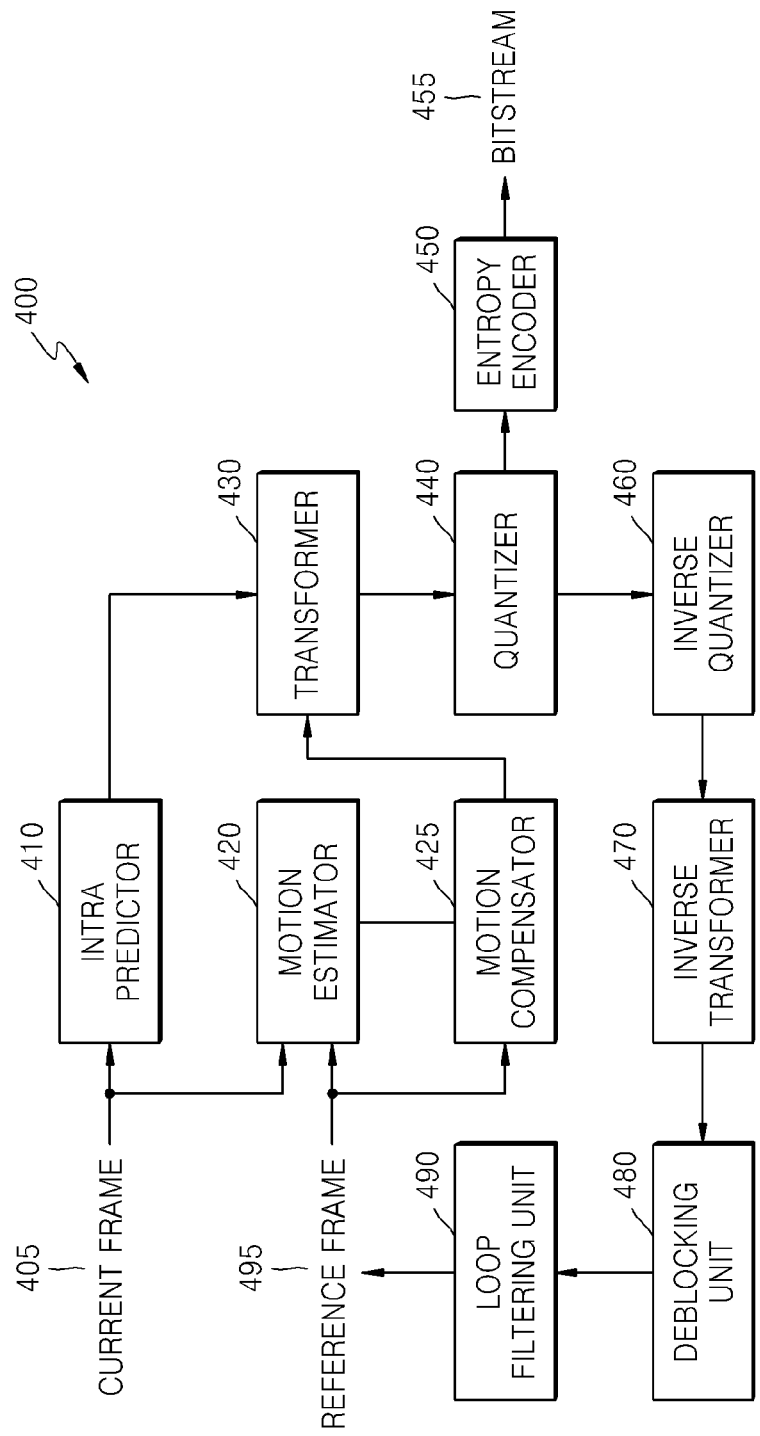
FIG. 4 is a block diagram of an image encoder based on coding units, according to an exemplary embodiment.

FIG. 4 is a block diagram of an image encoder 400 based on coding units, according to an exemplary embodiment. The image encoder 400 may perform operations of a coding unit determiner 120 of a video encoding apparatus 100 according to an exemplary embodiment to encode image data. That is, referring to FIG. 4, an intra predictor 410 performs intra prediction on coding units, from among a current frame 405, in an intra mode, and a motion estimator 420 and a motion compensator 425 perform inter estimation and motion compensation on coding units, from among the current frame 405, in an inter mode by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering a maximum size and a maximum depth of a current maximum coding unit, and the transformer 430 determines the size of the transformation unit in each coding unit from among the coding units having a tree structure.

Figure 5:
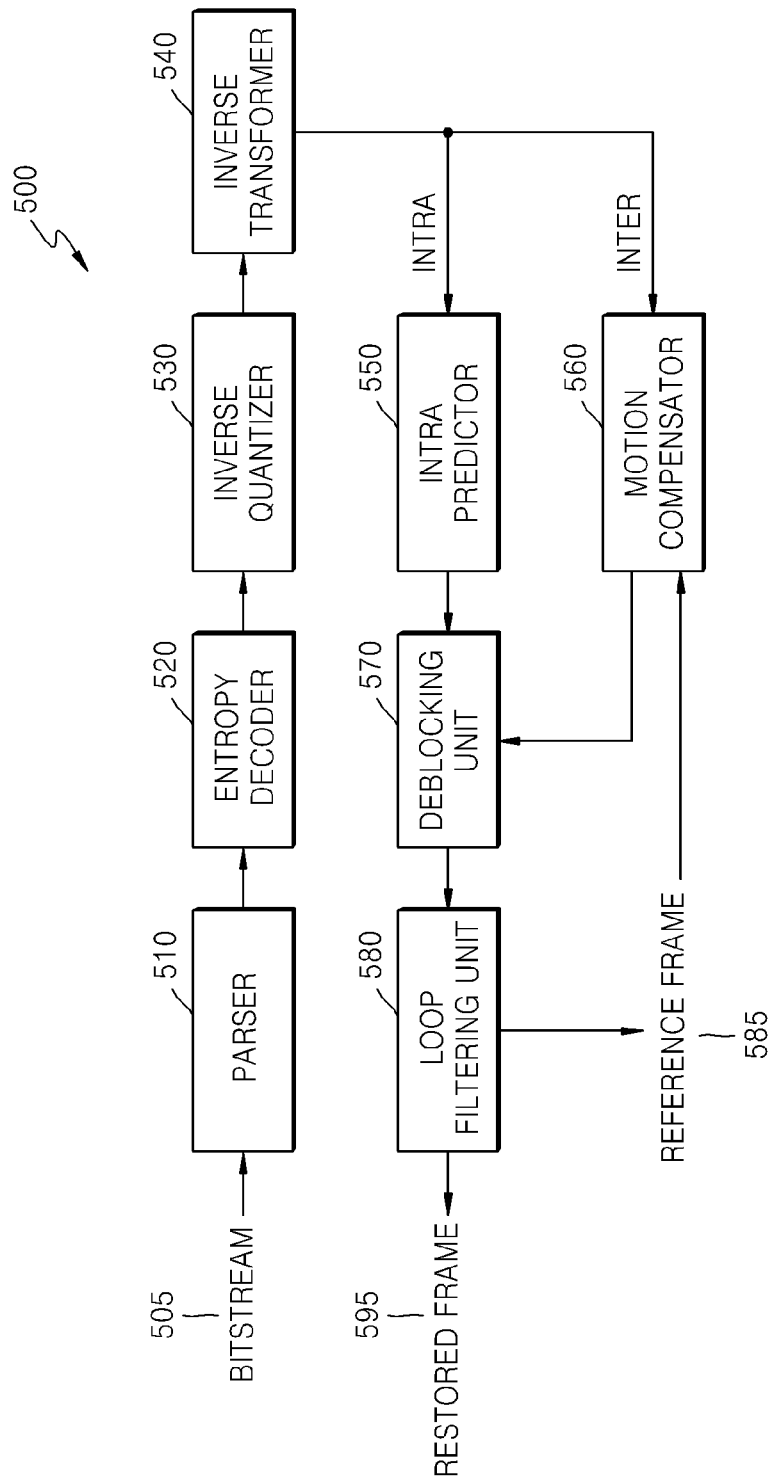
FIG. 5 is a block diagram of an image decoder based on coding units, according to an exemplary embodiment.

FIG. 5 is a block diagram of an image decoder 500 based on coding units, according to an exemplary embodiment. Referring to FIG. 5, a parser 510 parses encoded image data to be decoded and information about encoding used for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in an image data decoder 230 of a video decoding apparatus 200 according to an exemplary embodiment, the image decoder 500 may perform operations that are performed after the parser 510. In order for the image decoder 500 to be applied in the video decoding apparatus 200, elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 performs operations based on a size of a transformation unit for each coding unit.

Figure 6:
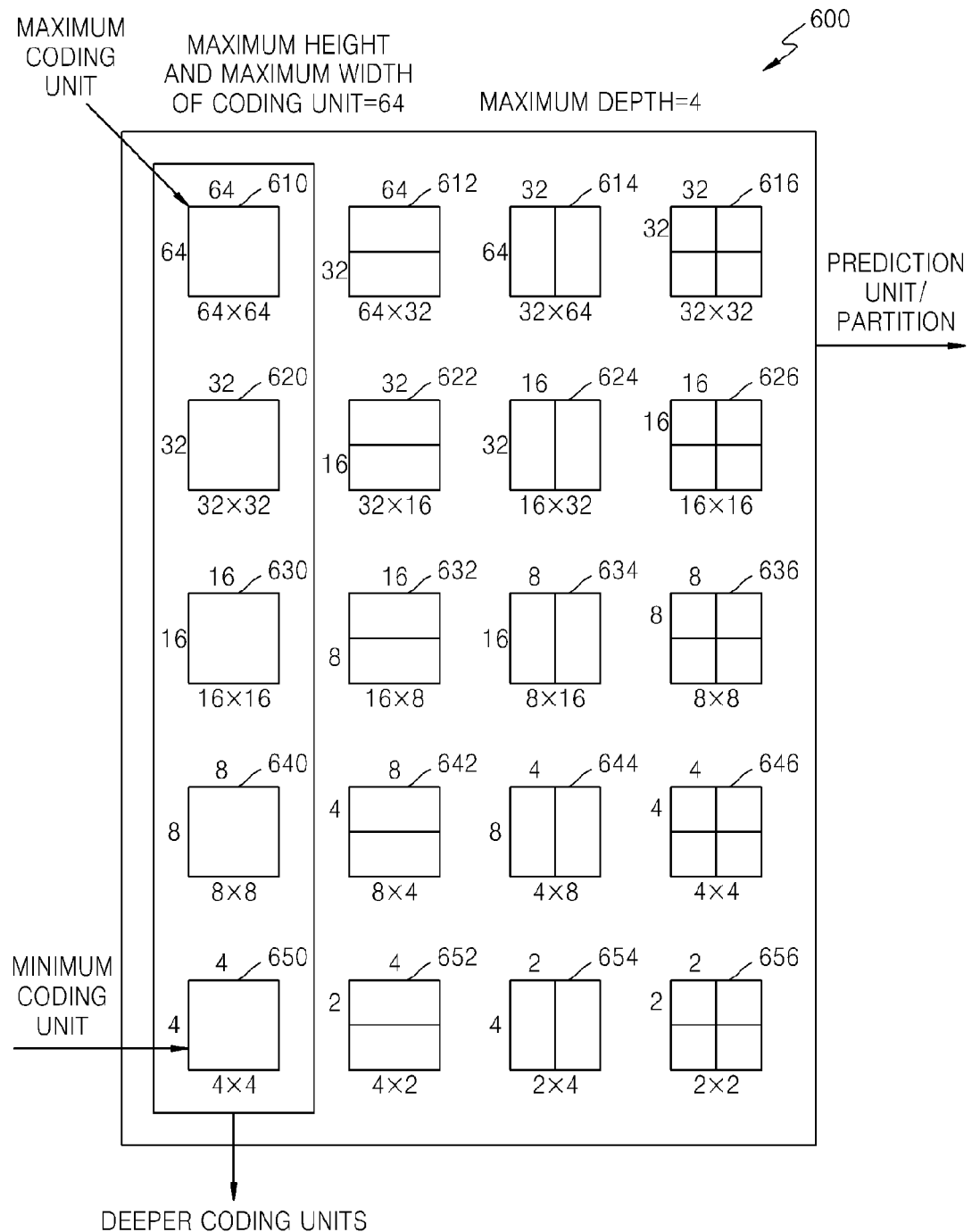
FIG. 6 is a diagram illustrating deeper coding units according to depths and partitions according to an exemplary embodiment.

FIG. 6 is a diagram illustrating deeper coding units according to depths, and partitions, according to an exemplary embodiment.

A video encoding apparatus 100 and a video decoding apparatus 200 according to exemplary embodiments use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

Referring to FIG. 6, in a hierarchical structure 600 of coding units according to an exemplary embodiment, the maximum height and the maximum width of the coding units are each 64, and the maximum depth is 4. Since a depth deepens along a vertical axis of the hierarchical structure 600, a height and a width of a deeper coding unit are each split. Also, a prediction unit and partitions, which are bases for prediction encoding of each deeper coding unit, are shown along a horizontal axis of the hierarchical structure 600.

That is, a first coding unit 610 is a maximum coding unit in the hierarchical structure 600, wherein a depth is 0 and a size, i.e., a height by width, is 64×64. The depth deepens along the vertical axis, and a second coding unit 620 having a size of 32×32 and a depth of 1, a third coding unit 630 having a size of 16×16 and a depth of 2, a fourth coding unit 640 having a size of 8×8 and a depth of 3, and a fifth coding unit 650 having a size of 4×4 and a depth of 4 exist. The fifth coding unit 650 having the size of 4×4 and the depth of 4 is a minimum coding unit.

The prediction unit and the partitions of a coding unit are arranged along the horizontal axis according to each depth. That is, if the first coding unit 610 having the size of 64×64 and the depth of 0 is a prediction unit, the prediction unit may be split into partitions included in the first coding unit 610, i.e., a partition 610 having a size of 64×64, partitions 612 having a size of 64×32, partitions 614 having a size of 32×64, or partitions 616 having a size of 32×32.

Similarly, a prediction unit of the second coding unit 620 having the size of 32×32 and the depth of 1 may be split into partitions included in the second coding unit 620, i.e., a partition 620 having a size of 32×32, partitions 622 having a size of 32×16, partitions 624 having a size of 16×32, and partitions 626 having a size of 16×16.

Similarly, a prediction unit of the third coding unit 630 having the size of 16×16 and the depth of 2 may be split into partitions included in the third coding unit 630, i.e., a partition having a size of 16×16 included in the third coding unit 630, partitions 632 having a size of 16×8, partitions 634 having a size of 8×16, and partitions 636 having a size of 8×8.

Similarly, a prediction unit of the fourth coding unit 640 having the size of 8×8 and the depth of 3 may be split into partitions included in the fourth coding unit 640, i.e., a partition having a size of 8×8 included in the fourth coding unit 640, partitions 642 having a size of 8×4, partitions 644 having a size of 4×8, and partitions 646 having a size of 4×4.

The fifth coding unit 650 having the size of 4×4 and the depth of 4 is the minimum coding unit and a coding unit of the lowermost depth. A prediction unit of the fifth coding unit 650 is only assigned to a partition having a size of 4×4.

In order to determine the at least one coded depth of the coding units of the maximum coding unit 610, a coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are used to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the first coding unit 610 may be selected as the coded depth and a partition type of the first coding unit 610.

Figure 7:
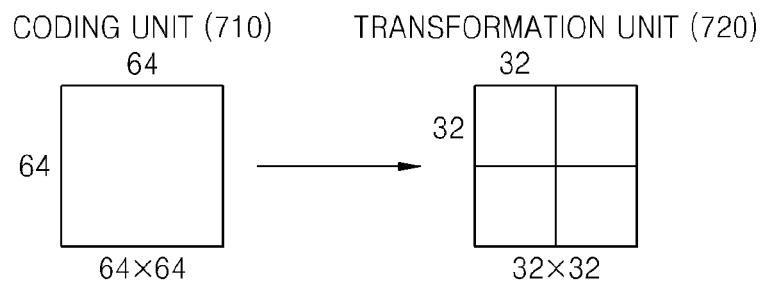
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

A video encoding or decoding apparatus 100 or 200 according to exemplary embodiments encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding or decoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, such that a transformation unit having the least coding error may be selected.

Figure 8:
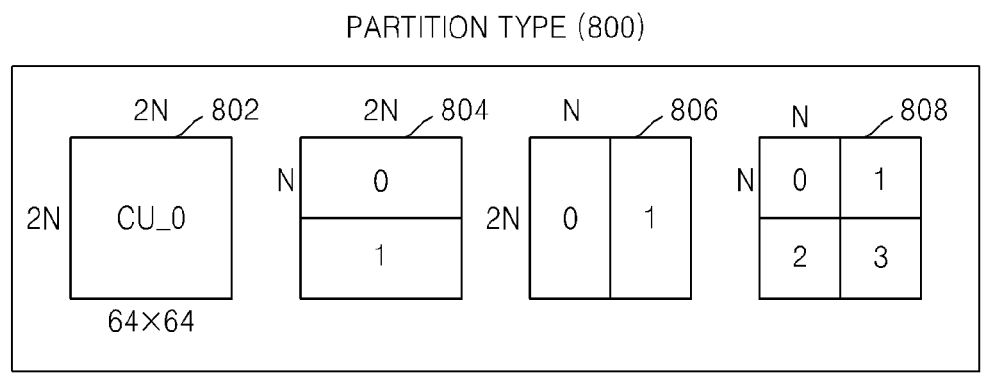
FIG. 8 is a diagram for describing encoding information of coding units corresponding to a coded depth, according to an exemplary embodiment.
Figure 8:
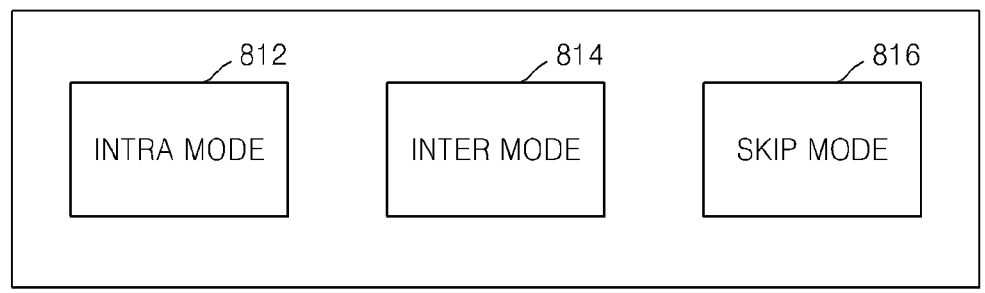
Figure 8:
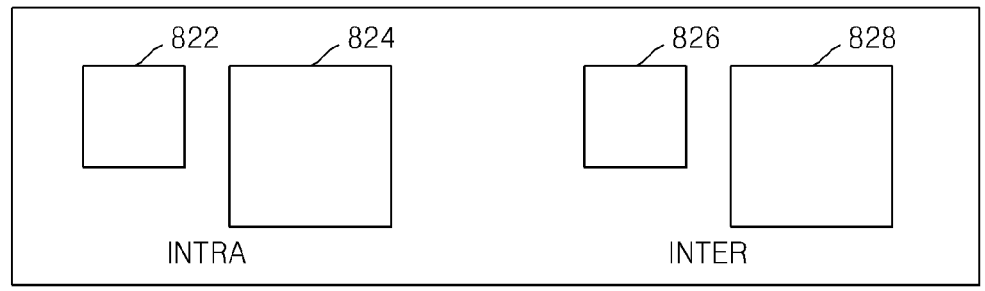

FIG. 8 is a diagram for describing encoding information of coding units corresponding to a coded depth, according to an exemplary embodiment. Referring to FIG. 8, an output unit 130 of a video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 about the partition type is information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type is set to indicate one of the partition 804 having a size of 2N×N, the partition 806 having a size of N×2N, and the partition 808 having a size of N×N The information 810 about the prediction mode indicates a prediction mode of each partition. For example, the information 810 about the prediction mode may indicate a mode of prediction encoding performed on a partition indicated by the information 800 about the partition type, i.e., an intra mode 812, an inter mode 814, or a skip mode 816.

The information 820 about the size of a transformation unit indicates a transformation unit to be based on when transformation is performed on a current coding unit. For example, the transformation unit may be a first intra transformation unit 822, a second intra transformation unit 824, a first inter transformation unit 826, or a second intra transformation unit 828.

An image data and encoding information extractor 220 of a video decoding apparatus 200 according to an exemplary embodiment may extract and use the information 800, 810, and 820 for decoding, according to each deeper coding unit.

Figure 9:
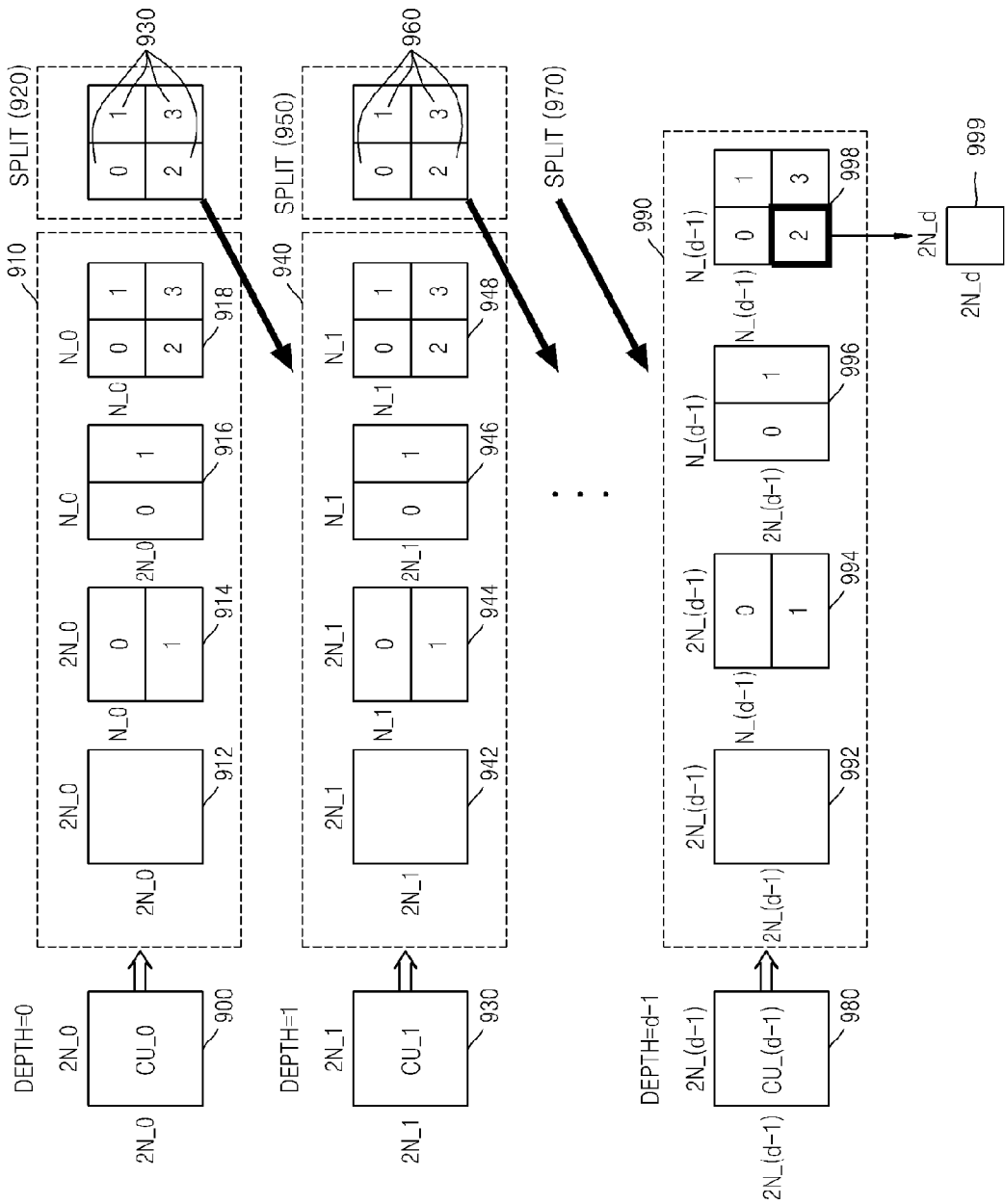
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The split information indicates whether a coding unit of a current depth is split into coding units of a lower depth.

Referring to FIG. 9, a prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. Though FIG. 9 only illustrates the partition types 912 through 918 which are obtained by symmetrically splitting the prediction unit 910, it is understood that a partition type is not limited thereto. For example, according to another exemplary embodiment, the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

For example, if the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

As an example, if an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operations according to each depth may be performed up to when a depth becomes d−1, and split information may be encoded as up to when a depth is one of 0 to d−2. For example, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth. In this case, a coded depth for the coding units of a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a minimum unit for the current maximum coding unit. A minimum unit according to an exemplary embodiment may be a rectangular data unit obtained by splitting a minimum coding unit 980 by 4. By performing the encoding repeatedly, a video encoding apparatus 100 according to an exemplary embodiment may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, split information of the coded depth is set to 0, and split information of depths excluding the coded depth is set to 1.

An image data and encoding information extractor 220 of a video decoding apparatus 200 according to an exemplary embodiment may extract and use the information about the coded depth and the prediction unit of the coding unit 900 to decode the partition 912. The video decoding apparatus 200 may determine a depth, in which split information is 0 as a coded depth by using split information according to depths, and use information about an encoding mode of the corresponding depth for decoding.

Figure 10:
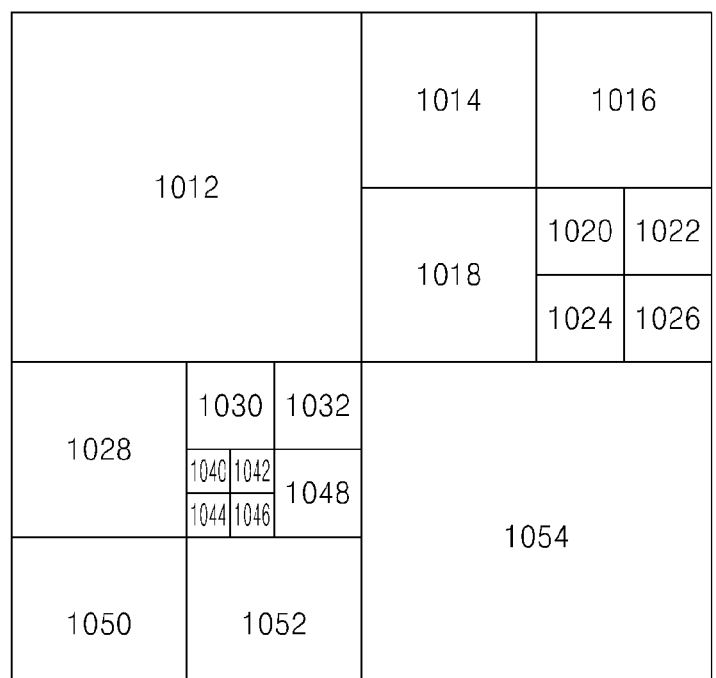
FIGS. 10 through 12 are diagrams for describing a relationship among coding units, prediction units, and transformation units, according to one or more exemplary embodiments.
Figure 11:
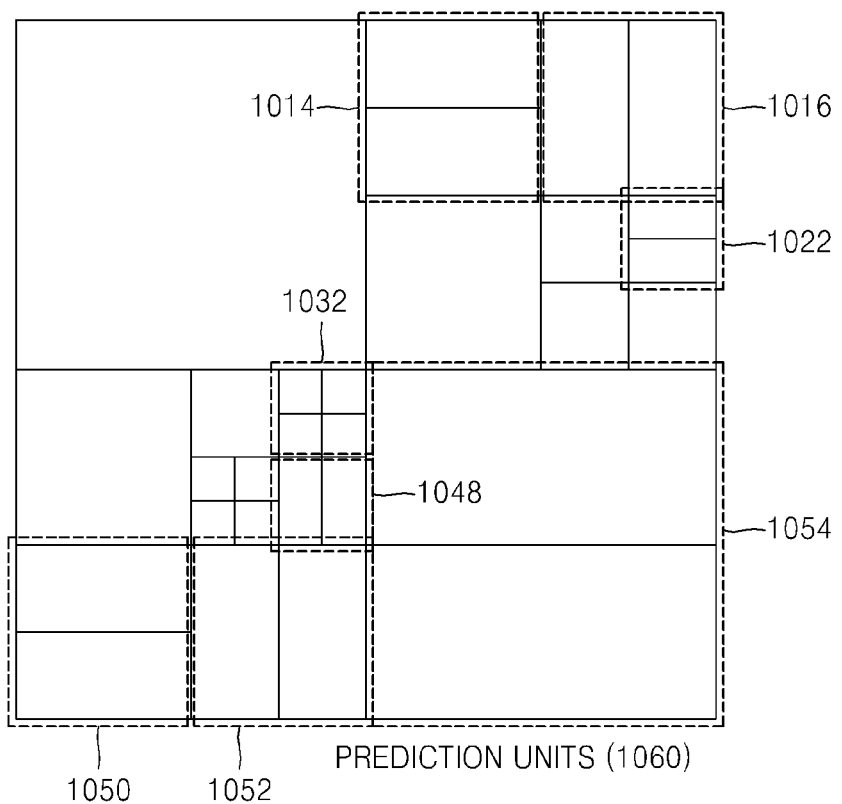
Figure 12:
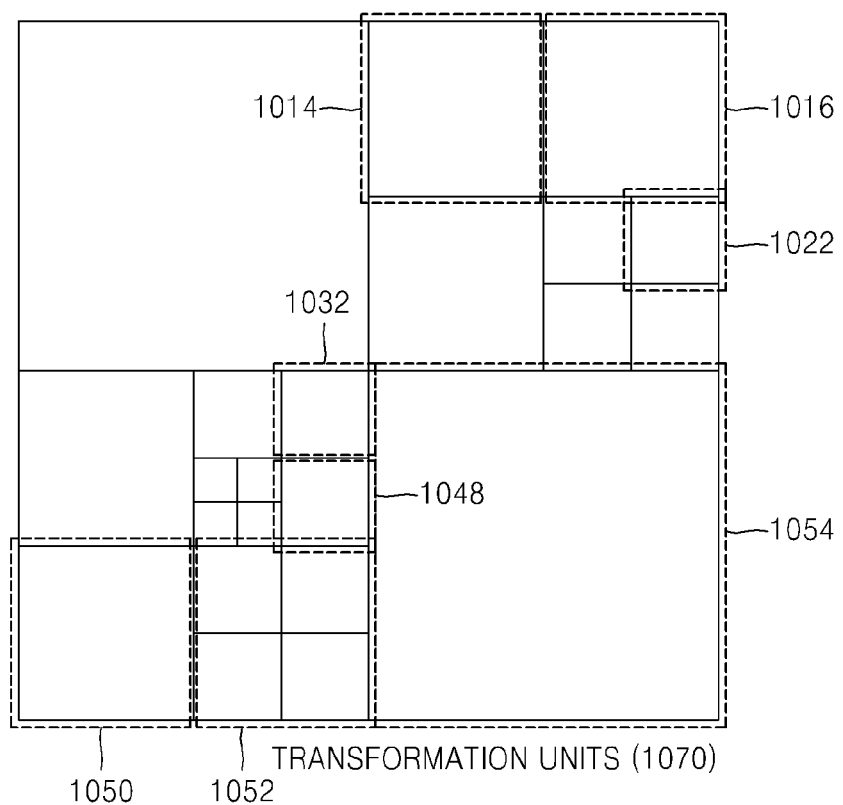

FIGS. 10 through 12 are diagrams for describing a relationship between coding units 1010, prediction units 1060, and transformation units 1070, according to one or more exemplary embodiments.

Referring to FIG. 10, the coding units 1010 are coding units having a tree structure, corresponding to coded depths determined by a video encoding apparatus 100 according to an exemplary embodiment, in a maximum coding unit. Referring to FIGS. 11 and 12, the prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting coding units of the coding units 1010. In particular, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 of the transformation units 1070 are different from those of the prediction units 1060 in terms of sizes and shapes. That is, the video encoding and decoding apparatuses 100 and 200 according to exemplary embodiments may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Exemplary table 1 shows the encoding information that may be set by the video encoding and decoding apparatuses 100 and 200.

TABLE 1

Split Information 0
(Encoding on Coding Unit having Size of 2N × 2N and Current Depth of d)

| | | | Size of Transformation Unit | | |
|---|---|---|---|---|---|
| Prediction Mode | Symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

An output unit 130 of the video encoding apparatus 100 may output the encoding information about the coding units having a tree structure, and an image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth in which a current coding unit is no longer split into a lower depth is a coded depth. Information about a partition type, prediction mode, and a size of a transformation unit may be defined for the coded depth. If the current coding unit is further split according to the split information, encoding is independently performed on split coding units of a lower depth.

A prediction mode may be one of an intra mode, an inter mode, and a skip mode. The intra mode and the inter mode may be defined in all partition types, and the skip mode may be defined in only a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or the width of the prediction unit. The asymmetrical partition types having the sizes of 2N×nU and 2N×nD may be respectively obtained by splitting the height of the prediction unit in ratios of 1:3 and 3:1, and the asymmetrical partition types having the sizes of nL×2N and nR×2N may be respectively obtained by splitting the width of the prediction unit in ratios of 1:3 and 3:1

The size of the transformation unit may be set to be two types in the intra mode and two types in the inter mode. For example, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a coding unit corresponding to a prediction unit, and a coding unit corresponding to a minimum unit. The coding unit corresponding to the coded depth may include at least one of a prediction unit and a minimum unit including the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used. However, it is understood that another exemplary embodiment is not limited thereto. For example, according to another exemplary embodiment, if a current coding unit is predicted based on encoding information of adjacent data units, data units adjacent to the current coding unit are searched using encoded information of the data units, and the searched adjacent coding units may be referred for predicting the current coding unit.

Figure 13:
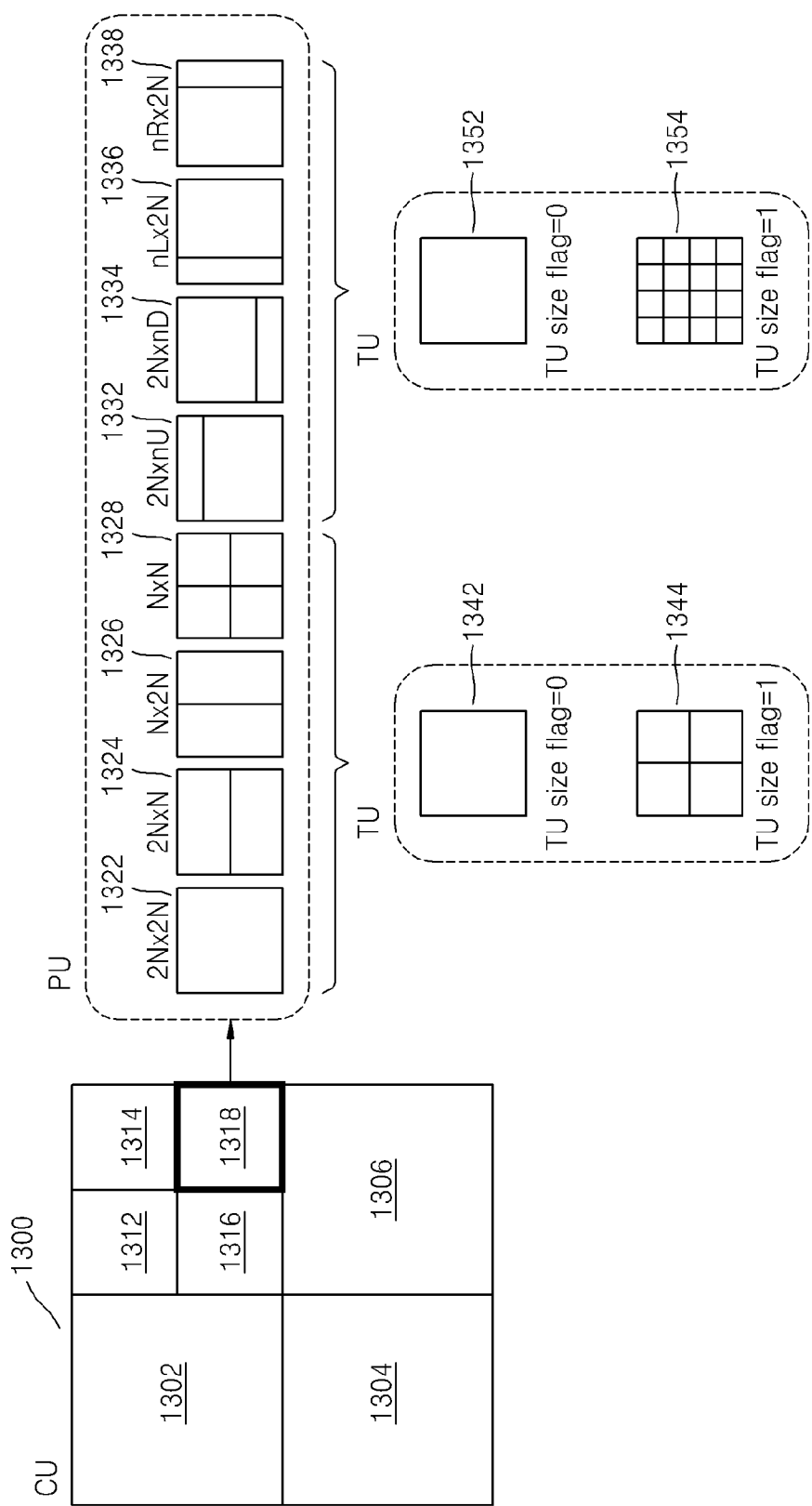
FIG. 13 is a diagram for describing a relationship among a coding unit, a prediction unit or a partition, and a transformation unit, according to encoding mode information of exemplary Table 1 below, according to an exemplary embodiment.

FIG. 13 is a diagram for describing a relationship between a coding unit, a prediction unit or a partition, and a transformation unit, according to encoding mode information of exemplary Table 1, according to an exemplary embodiment.

Referring to FIG. 13, a maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, though it is understood that the TU size flag is not limited to 1 bit, and a transformation unit may be hierarchically split having a tree structure while the TU size flag increases from 0.

In this case, the size of a transformation unit that has been actually used may be expressed by using a TU size flag of a transformation unit, according to an exemplary embodiment, together with a maximum size and minimum size of the transformation unit. According to an exemplary embodiment, a video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, a video decoding apparatus 200 may decode video by using the maximum transformation unit size information, the minimum transformation unit size information, and the maximum TU size flag.

For example, if the size of a current coding unit is 64×64 and a maximum transformation unit size is 32×32, the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, the TU size flag may be 0 or 1. Here, the TU size flag cannot be set to a value other than 0 or 1.

Thus, if it is defined that the maximum TU size flag is MaxTransformSizeIndex, a minimum transformation unit size is MinTransformSize, and a transformation unit size is RootTuSize when the TU size flag is 0, a current minimum transformation unit size CurrMinTuSize that can be determined in a current coding unit may be defined by Equation (1):

$$\text{CurrMinTuSize} = \max(\text{MinTransformSize}, \text{RootTuSize}/(2^{\wedge}\text{MaxTransformSizeIndex})) \quad (1).$$

Compared to the current minimum transformation unit size CurrMinTuSize that can be determined in the current coding unit, a transformation unit size RootTuSize when the TU size flag is 0 may denote a maximum transformation unit size that can be selected in the system. In Equation (1), RootTuSize/(2^MaxTransformSizeIndex) denotes a transformation unit size when the transformation unit size RootTuSize, when the TU size flag is 0, is split a number of times corresponding to the maximum TU size flag. Furthermore, MinTransformSize denotes a minimum transformation size. Thus, a smaller value from among RootTuSize/(2^MaxTransformSizeIndex) and MinTransformSize may be the current minimum transformation unit size CurrMinTuSize that can be determined in the current coding unit.

According to an exemplary embodiment, the maximum transformation unit size RootTuSize may vary according to the type of a prediction mode.

For example, if a current prediction mode is an inter mode, then RootTuSize may be determined by using Equation (2) below. In Equation (2), MaxTransformSize denotes a maximum transformation unit size, and PUSize denotes a current prediction unit size.

$$\text{RootTuSize} = \min(\text{MaxTransformSize}, \text{PUSize}) \quad (2).$$

That is, if the current prediction mode is the inter mode, the transformation unit size RootTuSize when the TU size flag is 0 may be a smaller value from among the maximum transformation unit size and the current prediction unit size.

If a prediction mode of a current partition unit is an intra mode, RootTuSize may be determined by using Equation (3) below. In Equation (3), PartitionSize denotes the size of the current partition unit.

$$\text{RootTuSize} = \min(\text{MaxTransformSize}, \text{PartitionSize}) \quad (3).$$

That is, if the current prediction mode is the intra mode, the transformation unit size RootTuSize when the TU size flag is 0 may be a smaller value from among the maximum transformation unit size and the size of the current partition unit.

However, the current maximum transformation unit size RootTuSize that varies according to the type of a prediction mode in a partition unit is merely exemplary, and is not limited thereto in another exemplary embodiment.

Figure 14:
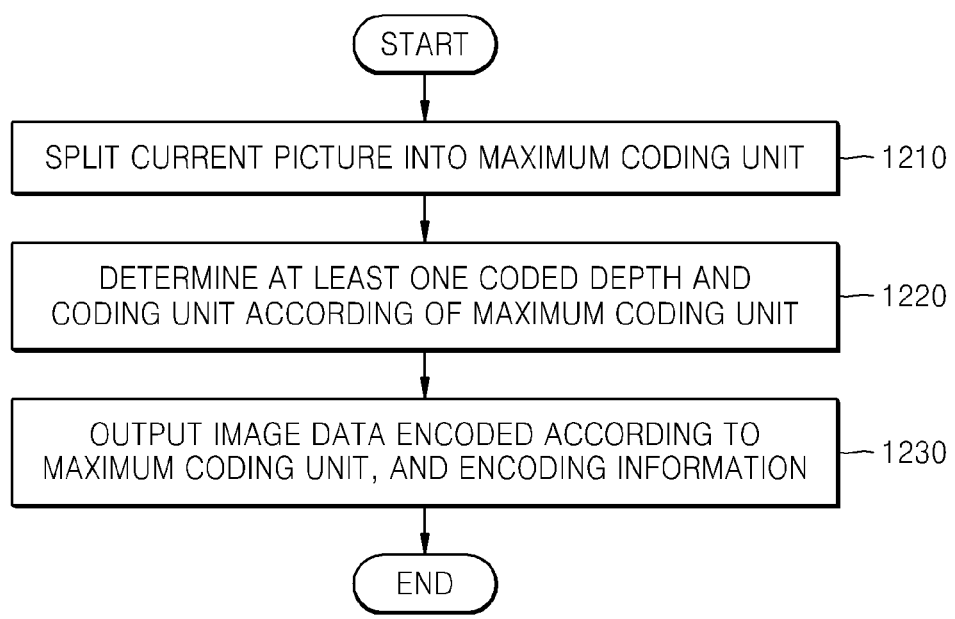
FIG. 14 is a flowchart illustrating a video encoding method according to an exemplary embodiment.

FIG. 14 is a flowchart illustrating a video encoding method according to an exemplary embodiment. Referring to FIG. 14, in operation 1210, a current picture is split into at least one maximum coding unit. A maximum depth indicating a total number of possible splitting times may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, a transformation unit according to partition types having the least encoding error is determined for each deeper coding unit. In order to determine a coded depth having a minimum encoding error in each maximum coding unit, encoding errors may be measured and compared in all deeper coding units according to depths.

In operation 1230, encoded image data that is the final encoding result according to the coded depth is output for each maximum coding unit, with encoding information about the coded depth and an encoding mode. The information about the encoding mode may include at least one of information about a coded depth or split information, information about a partition type of a prediction unit, a prediction mode, and a size of a transformation unit. The encoded information about the encoding mode may be transmitted to a decoder with the encoded image data.

Figure 15:
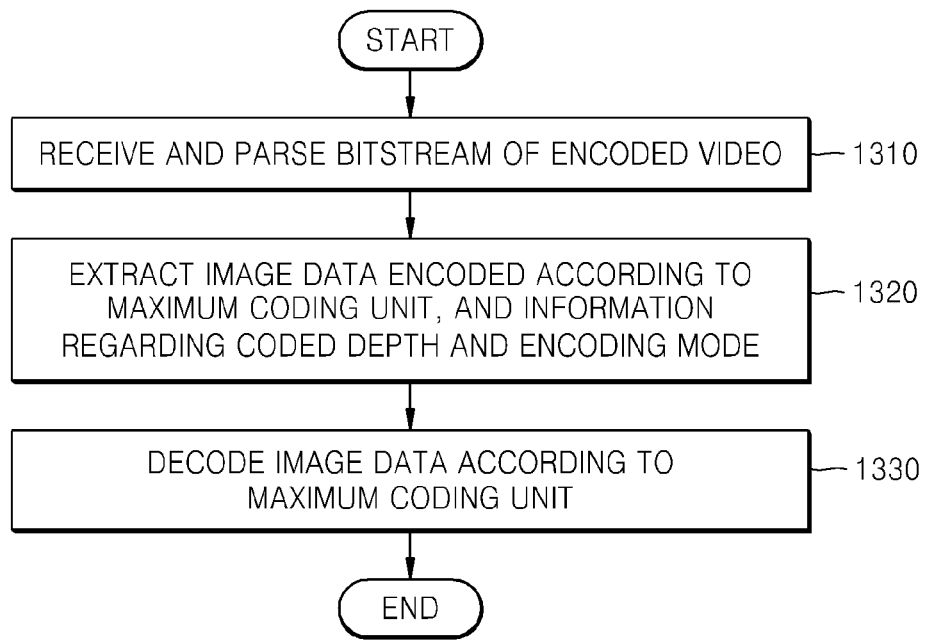
FIG. 15 is a flowchart illustrating a video decoding method according to an exemplary embodiment.

FIG. 15 is a flowchart illustrating a video decoding method according to an exemplary embodiment. Referring to FIG. 15, in operation 1310, a bitstream of an encoded video is received and parsed.

In operation 1320, encoded image data of a current picture assigned to a maximum coding unit and information about a coded depth and an encoding mode according to maximum coding units are extracted from the parsed bitstream. The coded depth of each maximum coding unit is a depth having the least encoding error in each maximum coding unit. In encoding each maximum coding unit, the image data is encoded based on at least one data unit obtained by hierarchically splitting each maximum coding unit according to depths.

According to the information about the coded depth and the encoding mode, the maximum coding unit may be split into coding units having a tree structure. Each of the coding units having the tree structure is determined as a coding unit corresponding to a coded depth, and is optimally encoded as to output the least encoding error. Accordingly, encoding and decoding efficiency of an image may be improved by decoding each piece of encoded image data in the coding units after determining at least one coded depth according to coding units.

In operation 1330, the image data of each maximum coding unit is decoded based on the information about the coded depth and the encoding mode according to the maximum coding units. The decoded image data may be reproduced by a reproducing apparatus, stored in a storage medium, or transmitted through a network.

Hereinafter, video encoding and decoding performed in an operating mode of a coding tool considering a size of a coding unit according to exemplary embodiments will be described with reference to FIGS. 16 to 23.

Figure 16:
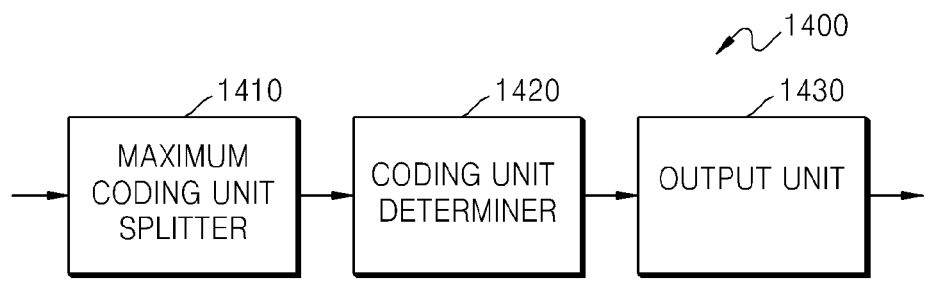
FIG. 16 is a block diagram of a video encoding apparatus based on a coding tool considering the size of a coding unit, according to an exemplary embodiment.

FIG. 16 is a block diagram of a video encoding apparatus 1400 based on a coding tool considering the size of a coding unit, according to an exemplary embodiment. Referring to FIG. 16, the apparatus 1400 includes a maximum coding unit splitter 1410, a coding unit determiner 1420, and an output unit 1430.

The maximum coding unit splitter 1410 splits a current picture into at least one maximum coding unit.

The coding unit determiner 1420 encodes the at least one maximum coding unit in coding units corresponding to depths. In this case, the coding unit determiner 1420 may encode a plurality of split regions of the at least one maximum coding unit in operating modes corresponding to coding tools according to the depths of the coding units, respectively, based on a relationship between a depth of a coding unit, a coding tool, and an operating mode.

The coding unit determiner 1420 encodes coding units corresponding to all depths, compares the results of encoding with one another, and determines a depth of a coding unit having a highest coding efficiency as a coded depth. Since in the split regions of the at least one maximum coding unit, a depth having a highest coding efficiency may differ according to location, a coded depth of each of the split regions of the at least one maximum coding unit may be determined independently of those of the other regions. Thus, more than one coded depth may be defined in one maximum coding unit.

Examples of a coding tool for encoding may include quantization, transformation, intra prediction, inter prediction, motion compensation, entropy coding, and loop filtering, which are video encoding techniques. According to an exemplary embodiment, in the video encoding apparatus 1400, each of a plurality of coding tools may be performed according to at least one operating mode. Here, the term, operating mode indicates a manner in which a coding tool is performed.

For example, if a coding tool is inter prediction, an operating mode of the coding tool may be classified into a first operating mode in which a median value of motion vectors of neighboring prediction units is selected, a second operating mode in which a motion vector of a prediction unit at a particular location from among neighboring prediction units is selected, and a third operating mode in which a motion vector of a prediction unit that includes a template most similar to a template of a current prediction unit from among neighboring prediction units is selected.

According to an exemplary embodiment, the video encoding apparatus 1400 may variably set an operating mode of a coding tool according to the size of a coding unit. In the present exemplary embodiment, the video encoding apparatus 1400 may variably set an operating mode of at least one coding tool according to the size of a coding unit. Since a depth of a coding unit corresponds to the size of the coding unit, the operating mode of at least one coding tool may be determined based on the depth of the coding unit corresponding to the size of the coding unit. Thus, the relationship among a depth of a coding unit, a coding tool, and an operating mode may be set. Similarly, if a coding tool may be performed in a prediction unit or a partition of a coding unit, an operating mode of the coding tool may be determined based on the size of a prediction unit or a partition.

The video encoding apparatus 1400 may set the relationship among a depth of a coding unit, a coding tool, and an operating mode before encoding is performed. For example, according to another exemplary embodiment, the video encoding apparatus 1400 may set the relationship among a depth of a coding unit, a coding tool, and an operating mode by encoding the coding units of the at least one maximum coding unit corresponding to depths in all operating modes of a predetermined coding tool and detecting an operating mode having a highest coding efficiency from among the operating modes.

The video encoding apparatus 1400 may assign an operating mode causing overhead bits to coding units corresponding to depths, the sizes of which are equal to or greater than a predetermined size, and may assign an operating mode that does not cause overhead bits to the other coding units, the sizes of which are less than the predetermined size.

The video encoding apparatus 1400 may encode and transmit information regarding the relationship among a depth of a coding unit, a coding tool, and an operating mode in slice units, frame units, picture units, or GOP units of an image. According to another exemplary embodiment, the video encoding apparatus 1400 may insert the information regarding encoding and the information regarding the relationship among a depth of a coding unit, a coding tool, and an operating mode into an SPS.

If the coding unit determiner 1420 performs intra prediction, which is a type of a coding tool, an operating mode of intra prediction may be classified according to a number of directions of prediction, i.e., directions in which neighborhood information may be referred to. Thus, an operating mode of intra prediction performed by the video encoding apparatus 1400 may include intra prediction modes representing the number of directions of prediction that vary according to the size of a coding unit.

Also, if the coding unit determiner 1420 performs intra prediction, an operating mode of intra prediction may be classified according to whether smoothing is to be performed in consideration of an image pattern. Thus, an operating mode of intra prediction performed by the video encoding apparatus 1400 may represent whether intra prediction is to be performed according to the size of a coding unit by differentiating an intra prediction mode for smoothing a region of a coding unit and an intra prediction mode for retaining a boundary line from each other.

If the coding unit determiner 1420 performs inter prediction, which is another type of a coding tool, the coding unit determiner 1420 may selectively perform at least one method of determining a motion vector. Thus, an operating mode of inter prediction performed by the video encoding apparatus 1400 may include an inter prediction mode representing a method of determining a motion vector, which is selectively performed according to the size of a coding unit.

If the coding unit determiner 1420 performs transformation, which is another type of a coding tool, the coding unit determiner 1420 may selectively perform rotational transformation according to the pattern of an image. The coding unit determiner 1420 may store a matrix of rotational transformation to be multiplied by a predetermined sized data matrix, which is a transformation target, so as to effectively perform rotational transformation. Thus, an operating mode of transformation performed by the video encoding apparatus 1400 may include a transformation mode representing an index of a matrix of rotational transformation corresponding to the size of a coding unit.

If the coding unit determiner 1420 performs quantization, which is another type of a coding tool, then a quantization parameter delta representing a difference between a current quantization parameter and a predetermined representative quantization parameter may be used. Thus, an operating mode of quantization performed by the video encoding apparatus 1400 may include a quantization mode indicating whether the quantization parameter delta that varies according to the size of a coding unit is to be used.

If the coding unit determiner 1420 performs interpolation, which is another type of a coding tool, interpolation filter may be used. The coding unit determiner 1420 may selectively set coefficients or the number of taps of the interpolation filter based on the size of a coding unit, a prediction unit or a partition and the depth of a coding unit. Thus, an operating mode of interpolation filtering performed by the video encoding apparatus 1400 may include an interpolation mode indicating coefficients or the number of taps of an interpolation filter that varies according to the size or the depth of a coding unit and the size of a prediction unit or a partition.

The output unit 1430 may output a bitstream, in which encoded video data (i.e., a final result of encoding received from the coding unit determiner 1420), information regarding a coded depth, and an encoding mode are included in for each of the at least one maximum coding unit. The encoded video data may be a set of a plurality of pieces of video data that are encoded in coding units corresponding to coded depths of the split regions of the at least one maximum coding unit, respectively.

Also, the above operating modes of coding tools for coding units corresponding to depths may be encoded in the form of the information regarding the relationship among a depth of a coding unit, a coding tool, and an operating mode and then be inserted into a bitstream.

According to an exemplary embodiment, the video encoding apparatus 1400 may perform a coding tool, such as quantization, transformation, intra prediction, inter prediction, motion compensation, entropy encoding, and loop filtering. These coding tools may be performed in different operating modes in coding units corresponding to depths, respectively. The above operating modes are just illustrative examples given for convenience of explanation, and the relationship between a depth of a coding unit (or the size of a coding unit), a coding tool, and an operating mode in the video encoding apparatus 1400 is not limited to the above exemplary embodiments.

Figure 17:
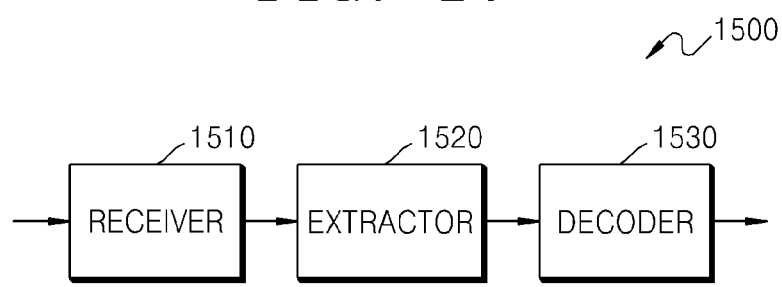
FIG. 17 is a block diagram of a video decoding apparatus based on a coding tool considering the size of a coding unit, according to an exemplary embodiment.

FIG. 17 is a block diagram of a video decoding apparatus 1500 based on a coding tool considering a size of a coding unit, according to an exemplary embodiment. Referring to FIG. 17, the video decoding apparatus 1500 includes a receiver 1510, an extractor 1520, and a decoder 1330.

The receiver 1510 receives and parses a bitstream including encoded video data. The extractor 1520 extracts the encoded video data, information regarding encoding, and information regarding a relationship among a depth of a coding unit, a coding tool, and an operating mode from the bitstream received via the receiver 1510.

The encoded video data is obtained by encoding image data in maximum coding units. The image data in each of the maximum coding units is hierarchically split into a plurality of split regions according depths, and each of the split regions is encoded in a coding unit of a corresponding coded depth. The information regarding encoding includes information regarding coded depths of the maximum coding units and an encoding mode.

For example, the information regarding the relationship among a depth of a coding unit, a coding tool, and an operating mode may be set in image data units, e.g., maximum coding units, frame units, field units, slice units, or GOP units. In another example, the information regarding encoding, and the information regarding the relationship among a depth of a coding unit, a coding tool, and an operating mode may be extracted from an SPS. Image data encoded in coding units of image data may be decoded in a selective operating mode of a coding tool, based on the information regarding the relationship among a depth of a coding unit, a coding tool, and an operating mode, which is defined in predetermined units of image data.

The decoder 1530 may decode the encoded video data in maximum coding units and in operating modes of coding tools in coding units corresponding to at least one coded depth, respectively, based on the information regarding encoding and the information regarding the relationship among a depth of a coding unit, a coding tool, and an operating mode that are extracted by the extractor 1520. The operating mode of a coding tool may be set according to a size of a coding unit. Since a size of a coding unit corresponding to the coded depth corresponds to the coded depth, the operation mode of the coding tool for the coding unit corresponding to the coded depth may be determined based on the coded depth. Similarly, if the coding tool for the coding unit is performed based on a prediction unit or a partition of the coding unit, the operation mode of the coding tool may be determined based on the size of a prediction unit or a partition.

Even if the relationship among a depth of a coding unit, a coding tool, and an operating mode is set according to a coding tool, the decoder 1530 may perform a decoding tool corresponding to the coding tool. For example, the decoder 1530 may inversely quantize a bitstream in a coding unit corresponding to a coded depth, based on information regarding a relationship among a depth of a coding unit, quantization, and an operating mode.

If the decoder 1530 performs intra prediction, which is a type of a decoding tool, the decoder 1530 may perform intra prediction on a current coding unit corresponding to a coded depth, based on information regarding a relationship among a depth of a coding unit, intra prediction, and an intra prediction mode. For example, the decoder 1530 may perform intra prediction on the current coding unit corresponding to the coded depth based on the information regarding the relationship among a depth of a coding unit, intra prediction, and an intra prediction mode, and neighborhood information according to a number of directions of intra prediction corresponding to the size of the current coding unit.

Also, the decoder 1530 may determine whether to perform intra prediction according to the coded unit of the current coding unit by differentiating an intra prediction mode for smoothing and an intra prediction mode for retaining a boundary line from each other, based on the information regarding the relationship among a depth of a coding unit, intra prediction, and an intra prediction mode.

If the decoder 1530 performs inter prediction, which is another type of a decoding tool, the decoder 1530 may perform inter prediction on the current coding unit corresponding to the coded depth based on the information regarding the relationship among a depth of a coding unit, inter prediction, and an inter prediction mode. For example, the decoder 1530 may perform the inter prediction mode on the current coding unit of the coded depth by using a method of determining a motion vector, based on the information regarding the relationship among a depth of a coding unit, inter prediction, and the inter prediction mode.

If the decoder 1530 performs inverse transformation, which is another type of a decoding tool, the decoder 1530 may selectively perform inverse rotational transformation based on information regarding a relationship among a depth of a coding unit, transformation, and a transformation mode. Thus, the decoder 1530 may perform inverse rotational transformation on the current coding unit corresponding to the coded depth by using a matrix of rotational transformation of an index corresponding to the coded depth, based on information regarding the relationship among a depth of a coding unit, transformation, and the inverse transformation mode.

If the decoder 1530 performs inverse quantization, which is another type of a coding tool, the decoder 1530 may perform inverse quantization on the current coding unit corresponding to the coded depth by using a quantization parameter delta corresponding to the coded depth, based on information regarding a depth of a coding unit, quantization, and a quantization mode.

If the decoder 1530 performs interpolation or extrapolation, which is another type of a coding tool, a filter for interpolation or extrapolation may be used. The decoder 1530 may perform filtering using the filter for interpolation or extrapolation for a current coding unit corresponding to the coded depth, by using coefficients or the number of taps of the filter for interpolation or extrapolation based on operating mode of filtering for interpolation or extrapolation, indicating coefficients or the number of taps of the filter for interpolation or extrapolation. The operating mode of filtering for interpolation or extrapolation may correspond to at least one of the size of the current coding unit, and the size of a prediction unit or a partition of the current coding unit.

The video decoding apparatus 1500 may reconstruct the original image from image data decoded by the decoder 1530. The reconstructed image may be reproduced by a display apparatus (not shown) or may be stored in a storage medium (not shown).

In the video encoding apparatus 1400 and the video decoding apparatus 1500 according to exemplary embodiments, the size of a coding unit may vary according to the characteristics of an image and a coding efficiency of the image. The size of a data unit, such as a coding unit, a prediction unit, or a transformation unit, may be increased so as to encode a large amount of image data, e.g., a high-resolution or high-quality image. The size of a macroblock having a hierarchical structure according to the H.264 standards may be 4×4, 8×8, or 16×16, but the video encoding apparatus 1400 and the video decoding apparatus 1500 according to one or more exemplary embodiments may expand the size of a data unit to 4×4, 8×8, 16×16, 32×32, 64×64, 128×128, or more.

The larger a data unit, the more image data included in the data unit, and the more various image characteristics in data units. Thus, it would be inefficient to encode all data units having various sizes by using only one coding tool.

Accordingly, the video encoding apparatus 1400 may determine a depth of a coding unit and an operating mode of a coding tool according to the characteristics of image data so as to increase a coding efficiency and encode information regarding a relationship among the depth of the coding unit, the coding tool, and the operating mode. Furthermore, the video decoding apparatus 1500 may reconstruct the original image by decoding a received bitstream, based on the information regarding a relationship among the depth of the coding unit, the coding tool, and the operating mode.

Accordingly, the video encoding apparatus 1400 and the video decoding apparatus 1500 may effectively encode and decode a large amount of image data, such as a high-resolution or high-quality image, respectively.

Figure 18:
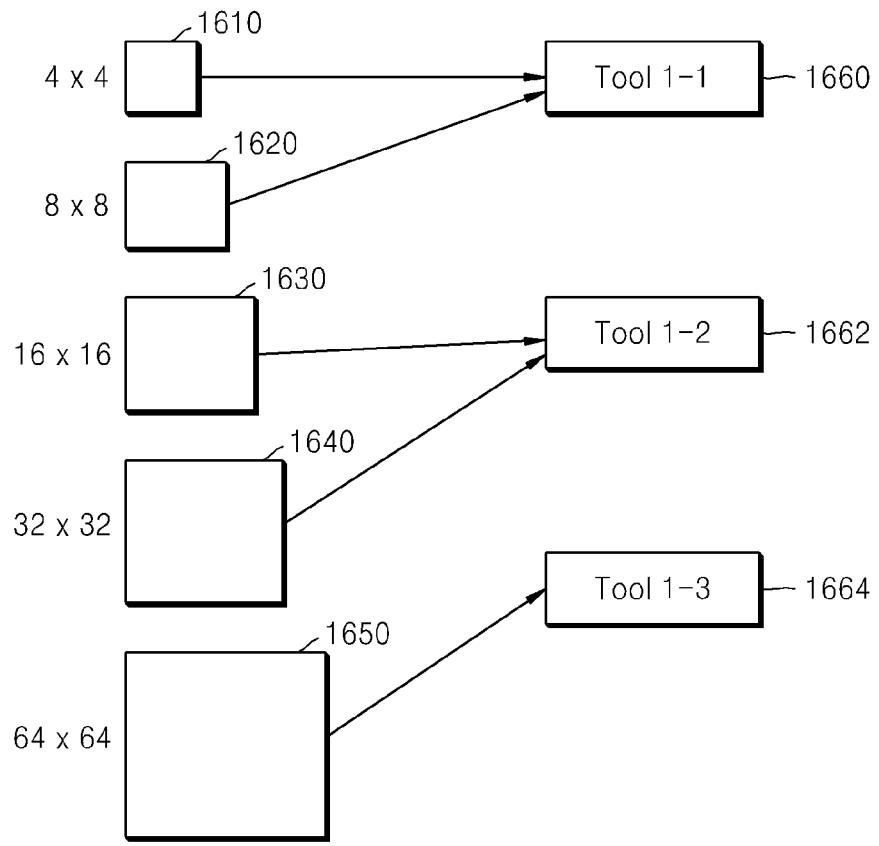
FIG. 18 is a diagram for describing a relationship among the size of a coding unit, a coding tool, and an operating mode, according to an exemplary embodiment.

FIG. 18 is a diagram for describing a relationship among the size of a coding unit, a coding tool, and an operating mode, according to an exemplary embodiment.

Referring to FIG. 18, according to an exemplary embodiment, in a video encoding apparatus 1400 or a video decoding apparatus 1500, a 4×4 coding unit 1610, an 8×8 coding unit 1620, a 16×16 coding unit 1630, a 32×32 coding unit 1640, and 64×64 coding unit 1650 may be used as coding units. If a maximum coding unit is the 64×64 coding unit 1650, a depth of the 64×64 coding unit 1650 is 0, a depth of the 32×32 coding unit 1640 is 1, a depth of the 16×16 coding unit 1630 is 2, a depth of the 8×8 coding unit 1620 is 3, and a depth of the 4×4 coding unit 1610 is 4.

The video encoding apparatus 1400 may adaptively determine an operating mode of a coding tool according to a depth of a coding unit. For example, if a first coding tool TOOL1 may be performed in a first operating mode TOOL1-1 1660, a second operating mode TOOL1-2 1662, and a third operating mode TOOL1-3, the video encoding apparatus 1400 may perform the first coding tool TOOL1 in the first operating mode TOOL1-1 1660 with respect to the 4×4 coding unit 1610 and the 8×8 coding unit 1620, perform the first coding tool TOOL1 in the second operating mode 1662 with respect to the 16×16 coding unit 1630 and the 32×32 coding unit 1640, and perform the first coding tool TOOL1 in the third operating mode 1664 with respect to the 64×64 coding unit 1650.

The relationship among the size of a coding unit, a coding tool, and an operating mode may be determined by encoding a current coding unit in all operating modes of a corresponding coding tool and detecting an operating mode causing a result of encoding with a highest coding efficiency from among the operating modes, during encoding of the current coding unit. In another exemplary embodiment, the relationship among the size of a coding unit, a coding tool, and an operating mode may be predetermined by, for example, at least one of the performance of an encoding system, a user's requirements, or ambient conditions.

Since the size of a maximum coding unit is fixed with respect to predetermined data, the size of a coding unit corresponds to a depth of the coding unit itself. Thus, a relationship between a coding tool adaptive to the size of a coding unit and an operating mode may be encoded by using information regarding a relationship among a depth of a coding unit, a coding tool, and an operating mode.

The information regarding the relationship among a depth of a coding unit, a coding tool, and an operating mode may indicate optimal operating modes of coding tools in units of depths of coding units, respectively.

TABLE 2

|  | Depth of coding unit = 4 | Depth of coding unit = 3 | Depth of coding unit = 2 | Depth of coding unit = 1 | Depth of coding unit = 0 |
| --- | --- | --- | --- | --- | --- |
| operating mode of first coding tool | first operating mode | first operating mode | second operating mode | second operating mode | third operating mode |
| operating mode of second coding tool | first operating mode | second operating mode | second operating mode | third operating mode | third operating mode |

According to exemplary Table 2, the operating modes of the first and second coding tools may be variable applied to coding units having depths 4, 3, 2, 1, and 0, respectively. The information regarding the relationship among a depth of a coding unit, a coding tool, and an operating mode may be encoded and transmitted in sequence units, GOP units, picture units, frame units, or slice units of an image.

Various exemplary embodiments of a relationship among a depth of a coding unit, a coding tool, and an operating mode will now be described in detail.

Figure 19:
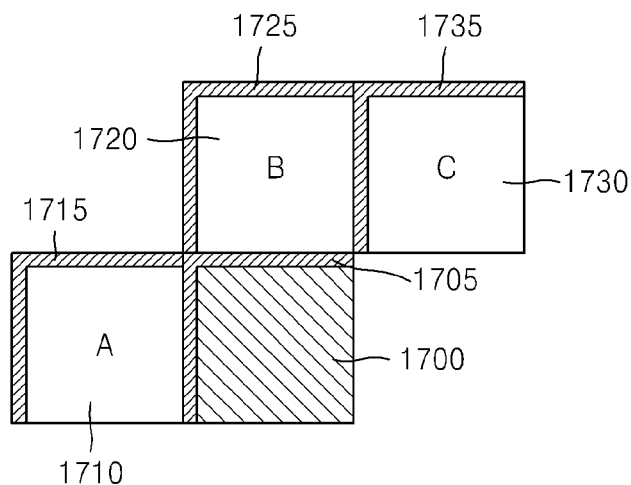
FIG. 19 is a diagram for describing a relationship among a depth of a coding unit, a coding tool, and an operating mode, according to an exemplary embodiment.

FIG. 19 is a diagram for describing a relationship among a depth of a coding unit, a coding tool (e.g., inter prediction), and an operating mode, according to an exemplary embodiment.

If a video encoding apparatus 1400 according to an exemplary embodiment performs inter prediction, at least one method of determining a motion vector may be used. Thus, an operating mode of inter prediction, which is a type of a coding tool, may be classified according to a method of determining a motion vector.

For example, referring to FIG. 19, in a first operating mode of inter prediction, a median value of motion vectors mvpA, mvpB, and mvpC of neighboring coding units A, B, and C 1710, 1720, and 1730 is selected as a predicted motion vector MVP of a current coding unit 1700, as indicated in Equation (4) below:

$$MVP = \mathrm{median}(mvpA, mvpB, mvpC) \qquad (4).$$

If the first operating mode is employed, an amount of calculation is low and overhead bits may not be used. Thus, even if inter prediction is performed on small-sized coding units in the first operating mode, an amount of calculation or an amount of bits to be transmitted is small.

For example, in a second operating mode of inter prediction, an index of the motion vector of a coding unit that is selected as a predicted motion vector of the current coding unit 1700 from among the motion vectors of the neighboring coding units A, B, and C 1710, 1720, and 1730, is displayed directly.

For example, if the video encoding apparatus 1400 performs inter prediction on the current coding unit 1700, the motion vector mvpA of the neighboring coding unit A 1710 may be selected as an optimal predicted motion vector of the current coding unit 1700 and an index of the motion vector mvpA may be encoded. Thus, although overhead occurs in an encoding side, caused by an index representing the predicted motion vector, an amount of calculation when performing inter prediction in the second operating mode is small in a decoding side.

For example, in a third operating mode of inter prediction, pixels 1705 on a predetermined location on the current coding unit 1700 are compared with pixels 1715, 1725, 1735 on predetermined locations on the neighboring coding units A, B, and C 1710, 1720, and 1730, pixels, the distortion degrees of which are lowest are detected from among the pixels 1715, 1725, 1735, and a motion vector of a neighboring coding unit including the detected pixels is selected as a predicted motion vector of the current coding unit 1700.

Thus, although an amount of calculation may be large for the decoding side to detect pixels, the distortion degrees of which are lowest, the encoding side does not experience overhead in bits to be transmitted. In particular, if inter prediction is performed on an image sequence including a specific image pattern in the third operating mode, a result of prediction is more precise than when a median value of motion vectors of neighboring coding units is used.

The video encoding apparatus 1400 may encode information regarding a relationship among the first operating mode, the second operating mode, and the third operating mode of inter prediction determined according to a depth of a coding unit. The video decoding apparatus 1500 according to an exemplary embodiment may decode image data by extracting the information regarding the first operating mode, the second operating mode, and the third operating mode of inter prediction determined according to the depth of the coding unit, from a received bitstream, and performing a decoding tool related to motion compensation and inter prediction performed on a current coding unit of a coded depth, based on the extracted information.

The video encoding apparatus 1400 checks whether overhead occurs in bits to be transmitted so as to determine an operating mode of inter prediction according to a size or depth of a coding unit. If a small coding unit is encoded, additional overhead may greatly lower a coding efficiency thereof, whereas if a large coding unit is encoded, a coding efficiency is not significantly influenced by additional overhead.

Accordingly, it may be efficient to perform inter prediction in the third operating mode that does not cause additional overhead when a small coding unit is encoded. In this regard, an example of a relationship between the size of a coding unit and an operating mode of inter prediction is shown in exemplary Table 3 below:

TABLE 3

| | Size of coding unit = 4 | Size of coding unit = 8 | Size of coding unit = 16 | Size of coding unit = 32 | Size of coding unit = 64 |
| --- | --- | --- | --- | --- | --- |
| operating mode of inter prediction | third operating mode | third operating mode | first operating mode | second operating mode | second operating mode |

Figure 20:
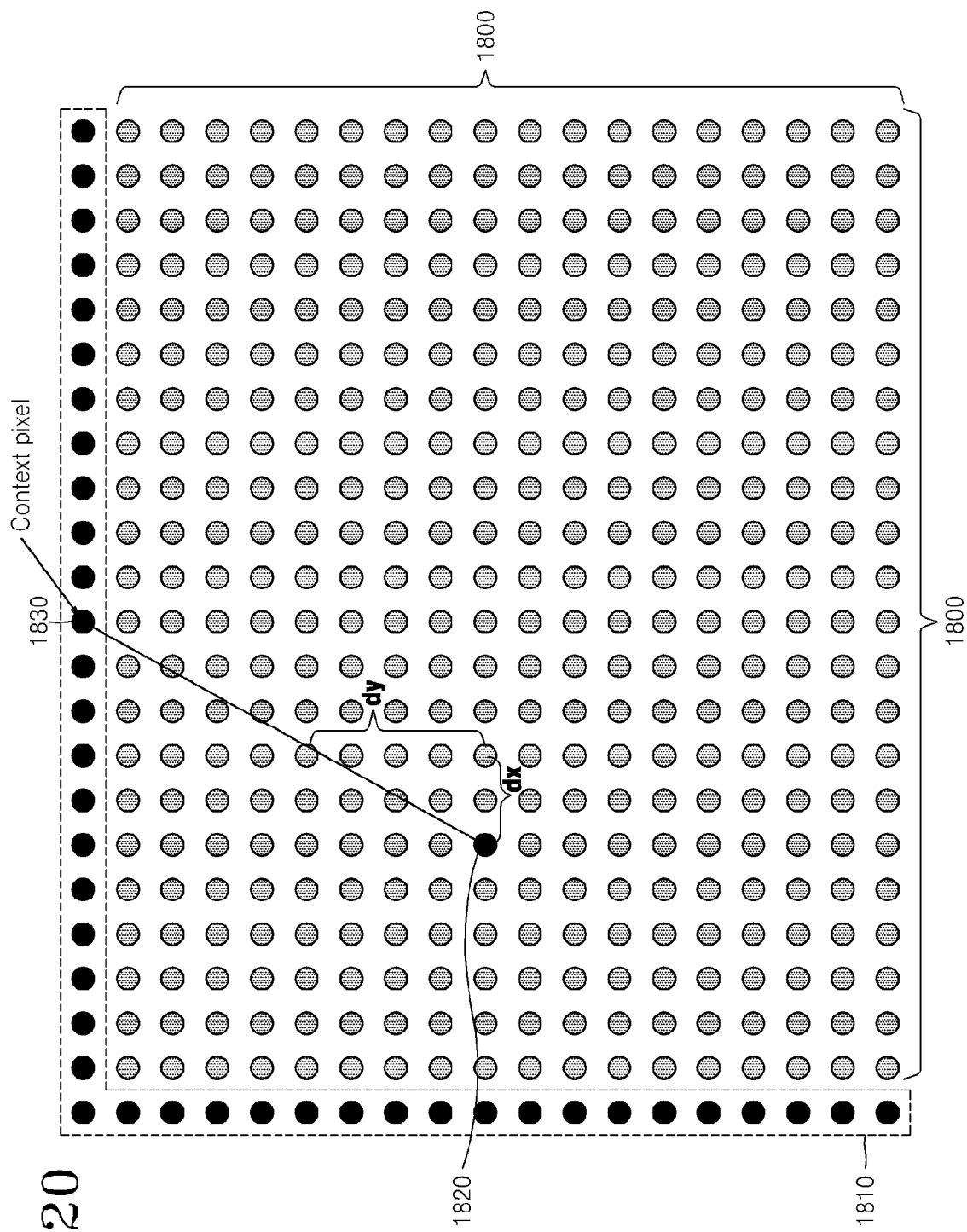
FIG. 20 is a diagram for describing a relationship among a depth of a coding unit, a coding tool, and an operating mode, according to an exemplary embodiment.

FIG. 20 is a diagram for describing a relationship among a depth of a coding unit, a coding tool (e.g., intra prediction), and an operating mode, according to an exemplary embodiment.

A video encoding apparatus 1400 according to an exemplary embodiment may perform directional extrapolation as intra prediction by using reconstructed pixels 1810 neighboring to a current coding unit 1800. For example, a direction of intra prediction may be defined as $\tan^{-1}(dx, dy)$, and inter prediction may be performed in various directions according to a plurality of (dx, dy) parameters.

A neighboring pixel 1830 on a line extending from a current pixel 1820 in the current coding unit 1800, which is to be predicted, and being inclined by an angle of $\tan^{-1}(dy/dx)$ determined by values dx and dy from the current pixel 1820, may be used as a predictor of the current pixel 1830. The neighboring pixel 1830 may belong to a coding unit that is located to an upper or left side of the current coding unit 1800, which was previously encoded and reconstructed.

If intra prediction is performed, the video encoding apparatus 1400 may adjust a number of directions of intra prediction according to the size of a coding unit. Thus, operating modes of intra prediction, which is a type of a coding tool, may be classified according to the number of the directions of intra prediction.

A number of directions of intra prediction may vary according to the size and hierarchical tree structure of a coding unit. Overhead bits used to represent an intra prediction mode may decrease a coding efficiency of a small coding unit but does not affect a coding efficiency of a large coding unit.

Thus, the video encoding apparatus 1400 may encode information regarding a relationship among a depth of a coding unit and the number of directions of intra prediction. Also, a video decoding apparatus 1500 according to an exemplary embodiment may decode image data by extracting the information regarding a relationship among a depth of a coding unit and the number of directions of intra prediction from a received bitstream, and performing a decoding tool related to intra prediction performed on a current coding unit of a coded depth, based on the extracted information.

The video encoding apparatus 1400 considers an image pattern of the current coding unit so as to determine an operating mode of intra prediction according to the size or depth of a coding unit. In the case of an image containing detailed components, intra prediction may be performed by using linear extrapolation, and thus, a large number of directions of intra prediction may be used. However, in the case of a flat region of an image, the number of directions of intra prediction may be relatively small. For example, a plain mode or a bi-linear mode using interpolation of reconstructed neighboring pixels may be used to perform intra prediction on a flat region of an image.

Since a large coding unit is probably determined in a flat region of an image, the number of directions of intra prediction may be relatively small when an intra prediction mode is performed on the large coding unit. Also, since a small coding unit is probably determined in a region including detailed components of an image, the number of directions of intra prediction may be relatively large when the intra prediction mode is performed on the small coding unit. Thus, a relationship between the size of a coding unit and the intra prediction mode may be considered as a relationship between the size of the coding unit and the number of directions of intra prediction. An example of the relationship between the size of the coding unit and the number of directions of intra prediction is shown in exemplary Table 4 below:

TABLE 4

|  | Size of coding unit = 4 | Size of coding unit = 8 | Size of coding unit = 16 | Size of coding unit = 32 | Size of coding unit = 64 |
| --- | --- | --- | --- | --- | --- |
| Number of directions of intra prediction | 9 | 9 | 33 | 17 | 5 |

A large coding unit may include image patterns that are arranged in various directions, and intra prediction may thus be performed on the large coding unit by using linear extrapolation. In this case, a relationship between the size of a coding unit and the intra prediction mode may be set as shown in exemplary Table 5 below:

TABLE 5

|  | Size of coding unit = 4 | Size of coding unit = 8 | Size of coding unit = 16 | Size of coding unit = 32 | Size of coding unit = 64 |
| --- | --- | --- | --- | --- | --- |
| Number of directions of intra prediction | 9 | 9 | 33 | 33 | 17 |

According to an exemplary embodiment, prediction encoding is performed in various intra prediction modes set according to the sizes of coding units, thereby more efficiently compressing an image according to the characteristics of the image.

Predicted coding units output from the video encoding apparatus 1400 by performing various intra prediction modes according to depths of coding units have a predetermined directionality according to the type of an intra prediction mode. Due to a directionality in such predicted coding units, an efficiency of predicting may be high when pixels of a current coding unit that is to be encoded have a predetermined directionality, and may be low when the pixels of the current coding unit do not have the predetermined orientation. Thus, a predicted coding unit obtained using intra prediction may be post-processed by producing a new predicted coding unit by changing values of pixels in the predicted coding unit by using these pixels and at least one neighboring pixel, thereby improving an efficiency of predicting an image.

For example, in the case of a flat region of an image, it may be efficient to perform post-processing for smoothing on a predicted coding unit obtained using intra prediction. Also, in the case of a region having detailed components of the image, it may be efficient to perform a post-processing for retaining the detailed components on a predicted coding unit obtained using intra prediction.

Thus, the video encoding apparatus 1400 may encode information regarding a relationship between a depth of a coding unit and an operating mode indicating whether a predicted coding unit obtained using intra prediction is to be post-processed. Also, the video decoding apparatus 1500 may decode image data by extracting the information regarding the relationship between a depth of a coding unit and an operating mode indicating whether a predicted coding unit obtained using intra prediction is to be post-processed, from a received bitstream, and performing a decoding tool related to intra prediction performed on a current coding unit of a coded depth, based on the extracted information.

In the video encoding apparatus 1400, an intra prediction mode, in which post-processing for smoothing is performed and an intra prediction mode in which post-processing for smoothing is not performed, may be selected for a flat region of an image and a region including detailed components of the image, respectively, as the operating mode indicating whether a predicted coding unit obtained using intra prediction is to be post-processed.

A large coding unit may be determined in a flat region of an image and a small coding unit may be determined in a region containing detailed components of the image. Thus, the video encoding apparatus 1400 may determine that an intra prediction mode, in which post-processing for smoothing is performed, is performed on the large coding unit and an intra prediction mode, in which post-processing for smoothing is not performed, is performed on the small coding unit.

Accordingly, a relationship between a depth of a coding unit and an operating mode indicating whether a predicted coding unit obtained by intra prediction is to be post-processed may be considered as a relationship between the size of a coding unit and whether post-processing is to be performed. In this regard, an example of a relationship among the size of a coding unit and an operating mode of intra prediction may be shown in exemplary Table 6 below:

TABLE 6

|  | Size of coding unit = 4 | Size of coding unit = 8 | Size of coding unit = 16 | Size of coding unit = 32 | Size of coding unit = 64 |
| --- | --- | --- | --- | --- | --- |
| Post-processing mode of intra prediction | 0 | 0 | 1 | 1 | 1 |

If the video encoding apparatus 1400 performs transformation, which is a type of a coding tool, rotational transformation may be selectively performed according to an image pattern. For efficient calculation of rotational transformation, a data matrix for rotational transformation may be stored in memory. If the video encoding apparatus 1400 performs rotational transformation or if the video decoding apparatus 1500 performs inverse rotational transformation, related data may be called from the memory by using an index of rotational transformation data used for the calculation. Such rotational transformation data may be set in coding units or transformation units, or according to the type of a sequence.

Thus, the video encoding apparatus 1400 may set a transformation mode indicated by an index of a matrix of rotational transformation corresponding to a depth of a coding unit as an operating mode of transformation. The video encoding apparatus 1400 may encode information regarding a relationship between the size of a coding unit and the transformation mode indicating the index of the matrix of rotational transformation.

The video decoding apparatus 1500 may decode image data by extracting the information regarding the relationship between a depth of a coding unit and the transformation mode indicating the index of the matrix of rotational transformation from a received bitstream, and performing inverse rotational transformation on a current coding unit of a coded depth, based on the extracted information.

Accordingly, a relationship among a depth of a coding unit, rotational transformation, and an operating mode may be considered as a relationship between the size of a coding unit and the index of the matrix of rotational transformation. In this regard, a relationship between the size of a coding unit and an operating mode of rotational transformation may be shown in exemplary Table 7 below:

TABLE 7

|  | Size of coding unit = 4 | Size of coding unit = 8 | Size of coding unit = 16 | Size of coding unit = 32 | Size of coding unit = 64 |
|---|---|---|---|---|---|
| Index of matrix of rotational transformation | 4-7 | 4-7 | 0-3 | 0-3 | 0-3 |

If the video encoding apparatus 1400 performs quantization, which is a type of a coding tool, a quantization parameter delta representing a difference between a current quantization parameter and a predetermined representative quantization parameter may be used. The quantization parameter delta may vary according to the size of a coding unit. Thus, in the video encoding apparatus 1400, an operating mode of quantization may include a quantization mode indicating whether the quantization parameter delta varying according to the size of a coding unit is to be used.

Thus, the video encoding apparatus 1400 may set a quantization mode indicating whether the quantization parameter delta corresponding to the size of a coding unit is to be used as an operating mode of quantization. The video encoding apparatus 1400 may encode information regarding a relationship between a depth of a coding unit and the quantization mode indicating whether the quantization parameter delta is to be used.

The video decoding apparatus 1500 may decode image data by extracting the information regarding the relationship between a depth of a coding unit and the quantization mode indicating whether the quantization parameter delta is to be used, from a received bitstream, and performing inverse quantization on a current coding unit of a coded depth, based on the extracted information.

Accordingly, a relationship among a depth of a coding unit, quantization, and an operating mode may be considered as a relationship between the size of a coding unit and whether the quantization parameter delta is to be used. In this regard, an example of a relationship between the size of a coding unit and an operating mode of quantization is as shown in exemplary Table 8 below:

TABLE 8

|  | Size of coding unit = 4 | Size of coding unit = 8 | Size of coding unit = 16 | Size of coding unit = 32 | Size of coding unit = 64 |
|---|---|---|---|---|---|
| Quantization parameter delta | false | false | true | false | false |

FIG. 21 illustrates syntax of a sequence parameter set 1900, in which information regarding a relationship among a depth of a coding unit, a coding tool, and an operating mode is inserted, according to an exemplary embodiment.

In FIG. 21, sequence_parameter_set denotes syntax of the sequence parameter set 1900 for a current slice. Referring to FIG. 21, the information regarding the relationship among a depth of a coding unit, a coding tool, and an operating mode is inserted into the syntax of the sequence parameter set 1900 for the current slice.

Furthermore, in FIG. 21, picture_width denotes the width of an input image, picture_height denotes the height of the input image, max_coding_unit_size denotes the size of a maximum coding unit, and max_coding_unit_depth denotes a maximum depth.

According to an exemplary embodiment, syntaxes use_independent_cu_decode_flag indicating whether decoding is to be independently performed in coding units, use_independent_cu_parse_flag indicating whether parsing is to be independently performed in coding units, use_mv_accuracy_control_flag indicating whether a motion vector is to be accurately controlled, use_arbitrary_direction_intra_flag indicating whether intra prediction is to be performed in an arbitrary direction, use_frequency_domain_prediction_flag indicating whether prediction encoding/decoding is to be performed in frequency transformation domain, use_rotational_transform_flag indicating whether rotational transformation is to be performed, use_tree_significant_map_flag indicating whether encoding/decoding is to be performed using a tree significant map, use_multi_parameter_intra_prediction_flag indicating whether intra prediction encoding is to be performed using a multi parameter, use_advanced_motion_vector_prediction_flag indicating whether advanced motion vector prediction is to be performed, use_adaptive_loop_filter_flag indicating whether adaptive loop filtering is to be performed, use_quadtree_adaptive_loop_filter_flag indicating whether quadtree adaptive loop filtering is to be performed, use_delta_qp_flag indicating whether quantization is to be performed using a quantization parameter delta, use_random_noise_generation_flag indicating whether random noise generation is to be performed, use_asymmetric_motion_partition_flag indicating whether motion estimation is to be performed in asymmetric prediction units, may be used as examples of a sequence parameter of a slice. It is possible to efficiently encode or decode the current slice by setting whether the above operations are to be used by using these syntaxes.

In particular, the length of an adaptive loop filter alf_filter_length, the type of the adaptive loop filter alf_filter_type, a reference value for quantizing an adaptive loop filter coefficient alf_qbits, and the number of color components of adaptive loop filtering alf_num_color may be set in the sequence parameter set 1900, based on use_adaptive_loop_filter_flag and use_quadtree_adaptive_loop_filter_flag.

The information regarding the relationship among a depth of a coding unit, a coding tool, and an operating mode used in a video encoding apparatus 1400 and a video decoding apparatus 1500 according to exemplary embodiments may indicate an operating mode of inter prediction corresponding to a depth of a coding unit uiDepth mvp_mode[uiDepth], and an operating mode significant_map_mode[uiDepth] indicating the type of a significant map from among tree significant maps. That is, either a relationship between inter prediction and a corresponding operating mode according to a depth of a coding unit, or a relationship between encoding/decoding using the tree significant map and a corresponding operating mode according to a depth of a coding unit, may be set in the sequence parameter set 1900.

A bit depth of an input sample input_sample_bit_depth and a bit depth of an internal sample internal_sample_bit_depth may also be set in the sequence parameter set 1900.

Information regarding a relationship among a depth of a coding unit, a coding tool, and an operating mode encoded by the video encoding apparatus 1400 or decoded by the video decoding apparatus 1500 according to an exemplary embodiment is not limited to the information inserted in the sequence parameter set 1900 illustrated in FIG. 21. For example, the information may be encoded or decoded in maximum coding units, slice units, frame units, picture units, or GOP units of the image.

FIG. 22 is a flowchart illustrating a video encoding method based on a coding tool considering a size of a coding unit, according to an exemplary embodiment. Referring to FIG. 22, in operation 2010, a current picture is split into at least one maximum coding unit.

In operation 2020, a coded depth is determined by encoding the at least one maximum coding unit in coding units corresponding to depths in operating modes of coding tools, respectively, based on a relationship among a depth of at least one coding unit of the at least one maximum coding unit, a coding tool, and an operating mode. Thus, the at least one maximum coding unit includes coding units corresponding to at least one coded depth.

The relationship among a depth of at least one coding unit of the at least one maximum coding unit, a coding tool, and an operating mode may be preset in units of slices, frames, GOPs, or frame sequences of an image. The relationship among a depth of at least one coding unit of the at least one maximum coding unit, a coding tool, and an operating mode may be determined by comparing results of encoding the coding units corresponding to depths in at least one operating mode matching coding tools with one another, and selecting an operating mode having a highest coding efficiency from among the at least one operating mode during encoding of the at least one maximum coding unit. Otherwise, the relationship among a depth of at least one coding unit of the at least one maximum coding unit, a coding tool, and an operating mode, may be determined in such a manner that coding units corresponding to depths, the sizes of which are less than or equal to a predetermined size, may correspond to an operating mode that does not cause overhead bits to be inserted in an encoded data stream and the other coding units, the sizes of which are greater than the predetermined size, may correspond to an operating mode causing the overhead bits.

In operation 2030, a bitstream including encoded video data of the at least one coded depth, information regarding encoding, and information regarding the relationship among a depth of at least one coding unit of the at least one maximum coding unit, a coding tool, and an operating mode in the at least one maximum coding unit is output. The information regarding encoding may include the at least one coded depth and information regarding an encoding mode in the at least one maximum coding unit. The information regarding the relationship among a depth of at least one coding unit of the at least one maximum coding unit, a coding tool, and an operating mode, may be inserted in slice units, frame units, GOPs, or frame sequences of the image.

FIG. 23 is a flowchart illustrating a video decoding method based on a coding tool considering a size of a coding unit, according to an exemplary embodiment. Referring to FIG. 23, in operation 2110, a bitstream including encoded video data is received and parsed.

In operation 2120, the encoded video data, information regarding encoding, and information regarding a relationship among a depth of a coding unit, a coding tool, and an operating mode are extracted from the bitstream. The information regarding a relationship among a depth of a coding unit, a coding tool, and an operating mode may be extracted from the bitstream in maximum coding units, slice units, frame units, GOP units, or frame sequences of an image.

In operation 2130, the encoded video data is decoded in maximum coding units according to an operating mode of a coding tool matching a coding unit corresponding to at least one coded depth, based on the information regarding encoding and the information regarding a relationship among a depth of a coding unit, a coding tool, and an operating mode, extracted from the bitstream.

While not restricted thereto, one or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, while not required in all exemplary embodiments, one or more units of the video encoding apparatus 100 or 1400, the video decoding apparatus 200 or 1500, the image encoder 400, and the image decoder 500 can include a processor or microprocessor executing a computer program stored in a computer-readable medium.

While exemplary embodiments have been particularly shown and described with reference to the drawings above, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the present inventive concept.

What is claimed is:

1. A method of decoding video data, the method comprising:
   obtaining split information of a coding unit from a bitstream;
   splitting an image into one or more coding units of depths using the split information;
   obtaining, from the bitstream, a quantization mode indicating which depth of coding unit contains a quantization parameter delta;
   determining the depth of coding unit containing the quantization parameter delta based on the quantization mode;
   when a depth of a current coding unit corresponds to the determined depth of coding unit, obtaining the quantization parameter delta for the current coding unit from the bitstream; and,
   performing inverse-quantization on transformation units included in the current coding unit using the quantization parameter delta,
   wherein:
   the image is split into a plurality of maximum coding units,
   a maximum coding unit, among the plurality of maximum coding units, is hierarchically split into the one or more coding units of depths including at least one of a current depth and a lower depth according to the split information, when the split information indicates a split for the current depth, the coding unit of a current depth is split into four coding units of the lower depth, independently from neighboring coding units, and when the split information indicates a non-split for the current depth, the transformation units are obtained from the coding unit of the current depth.

2. The method of claim 1, wherein a size of the coding unit varies according to the depth of the coding unit.

3. The method of claim 1, wherein the quantization mode is obtained from a header for one of a current picture, a current slice and a current sequence.

4. An apparatus for decoding video data, the apparatus comprising:

a parser which obtains split information of a coding unit from a bitstream, splits an image into one or more coding units of depths using the split information, obtains, from the bitstream, a quantization mode indicating which depth of coding unit contains a quantization parameter delta, determines the depth of coding unit containing the quantization parameter delta based on the quantization mode, and, when a depth of a current coding unit corresponds to the determined depth of coding unit, obtains the quantization parameter delta for the current coding unit from the bitstream; and, a decoder which performs inverse-quantization on transformation units included in the current coding unit using the quantization parameter delta, wherein:

the image is split into a plurality of maximum coding units, a maximum coding unit, among the plurality of maximum coding units, is hierarchically split into the one or more coding units of depths including at least one of a current depth and a lower depth according to the split information, when the split information indicates a split for the current depth, the coding unit of a current depth is split into four coding units of the lower depth, independently from neighboring coding units, and when the split information indicates a non-split for the current depth, the transformation units are obtained from the coding unit of the current depth.

\* \* \* \* \*